United States Patent
Patil et al.

(10) Patent No.: US 9,854,506 B2
(45) Date of Patent: Dec. 26, 2017

(54) TIMING SYNCHRONIZATION FOR DEVICE-TO-DEVICE DISCOVERY FOR ASYNCHRONOUS LTE DEPLOYMENTS

(71) Applicant: QUALCOMM Incorporated, San Diego, CA (US)

(72) Inventors: Shailesh Patil, Bridgewater, NJ (US); Libin Jiang, Bridgewater, NJ (US); Kapil Gulati, Long Branch, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 14/329,606

(22) Filed: Jul. 11, 2014

(65) Prior Publication Data
US 2015/0045017 A1 Feb. 12, 2015

Related U.S. Application Data

(60) Provisional application No. 61/863,901, filed on Aug. 8, 2013.

(51) Int. Cl.
*H04W 4/00* (2009.01)
*H04W 48/12* (2009.01)
(Continued)

(52) U.S. Cl.
CPC ........... *H04W 48/12* (2013.01); *H04L 5/0037* (2013.01); *H04W 56/002* (2013.01);
(Continued)

(58) Field of Classification Search
CPC ... H04W 48/12; H04W 76/023; H04W 88/10; H04W 56/0015; H04W 56/002; H04L 5/0037
(Continued)

(56) References Cited

U.S. PATENT DOCUMENTS

| | | |
|---|---|---|
| 2009/0013081 A1 | 1/2009 | Laroia et al. |
| 2013/0148566 A1 | 6/2013 | Doppler et al. |

(Continued)

FOREIGN PATENT DOCUMENTS

| | | | |
|---|---|---|---|
| JP | 2015-023472 A | * | 7/2013 |
| WO | WO 2013 165291 A1 | | 11/2013 |

OTHER PUBLICATIONS

Alcatel-Lucent Shanghai Bell et al., "Discussion of D2D Discovery Methods," 3GPP TSG RAN WG1 Meeting #73, Fukuoka, Japan, May 20-24, 2013, R1-132068, 5 pgs., downloaded from http://www.3gpp.org/ftp/tsg_ran/wg1_rl1/TSGR1_73/Docs/, 3rd Generation Partnership Project.

(Continued)

*Primary Examiner* — Timothy Pham
(74) *Attorney, Agent, or Firm* — Holland & Hart LLP

(57) ABSTRACT

Methods and devices are described for forwarding, managing, and/or detecting timing information for device-to-device discovery. Timing information may be received from a base station. A timing signal including the timing information may be transmitted. The timing signal may be transmitted during a sub-frame reserved for device-to-device discovery. Timing information for a base station may be transmitted to a user equipment (UE). Instructions to transmit a timing signal including the timing information during a sub-frame reserved for device-to-device discovery are also transmitted to the UE. Information indicating a timing of sub-frames reserved for device-to-device discovery by a neighboring base station may be received from a serving base station. A timing signal may be detected during at least one of the sub-frames reserved for device-to-device discovery. The timing signal may include timing information for the neighboring base station.

28 Claims, 18 Drawing Sheets

(51) Int. Cl.
*H04L 5/00* (2006.01)
*H04W 76/02* (2009.01)
*H04W 56/00* (2009.01)
*H04W 88/10* (2009.01)

(52) U.S. Cl.
CPC ..... *H04W 56/0015* (2013.01); *H04W 76/023* (2013.01); *H04W 88/10* (2013.01)

(58) Field of Classification Search
USPC ...................................................... 455/426.1
See application file for complete search history.

(56) References Cited

U.S. PATENT DOCUMENTS

| | | | | |
|---|---|---|---|---|
| 2013/0170470 A1* | 7/2013 | Kneckt | ............ | H04W 72/0446 370/330 |
| 2013/0294388 A1* | 11/2013 | Kawasaki | ............. | H04L 1/0045 370/329 |
| 2013/0322413 A1* | 12/2013 | Pelletier | ............ | H04W 72/1289 370/336 |
| 2014/0036793 A1 | 2/2014 | Johnsson et al. | | |
| 2014/0056220 A1 | 2/2014 | Poitau et al. | | |
| 2014/0254429 A1* | 9/2014 | Wang | ................... | H04L 5/0037 370/254 |
| 2014/0334388 A1* | 11/2014 | Novak | .............. | H04W 72/1263 370/329 |
| 2014/0370904 A1* | 12/2014 | Smith | ................... | H04W 8/005 455/450 |
| 2015/0009949 A1* | 1/2015 | Khoryaev | ............. | H04W 48/16 370/330 |
| 2015/0131571 A1* | 5/2015 | Fodor | ................... | H04W 8/005 370/329 |
| 2015/0282132 A1* | 10/2015 | Kim | ...................... | H04W 8/005 370/329 |
| 2015/0382173 A1* | 12/2015 | Wang | .................... | H04W 8/005 370/329 |
| 2016/0165559 A1* | 6/2016 | Nagata | ................ | H04W 56/002 370/350 |
| 2016/0234670 A1* | 8/2016 | Zhang | .................. | H04W 8/005 |

OTHER PUBLICATIONS

ISA/EPO, International Search Report and Written Opinion of the International Searching Authority, Int'l. App. No. PCT/US2014/046529, dated Oct. 22, 2014, European Patent Office, Rijswijk, NL, 10 pgs.

Institute for Information Industry (III), "Evaluations of D2D Discovery Schemes," 3GPP TSG RAN WG1 Meeting #73, Fukuoka, Japan, May 20-24, 2013, R1-132541, 1 pg., downloaded from http://www.3gpp.org/ftp/tsg_ran/wg1_rl1/TSGR1_73/Docs/, 3rd Generation Partnership Project.

IPEA/EPO, Second Written Opinion of the International Preliminary Examining Authority, Int'l. App. No. PCT/US2014/046529, dated Jul. 10, 2015, European Patent Office, Munich, DE, 5 pgs.

* cited by examiner

TIMING SYNCHRONIZATION FOR DEVICE-TO-DEVICE DISCOVERY FOR ASYNCHRONOUS LTE DEPLOYMENTS

CROSS REFERENCES

The present Application for patent claims priority to U.S. Provisional Patent Application No. 61/863,901 by Patil et al., entitled "Timing Synchronization for Device to Device Discovery for Asynchronous LTE Deployments," filed Aug. 8, 2013, and assigned to the assignee hereof.

FIELD OF THE DISCLOSURE

The following relates generally to wireless communication, and more specifically to device-to-device discovery.

DESCRIPTION OF RELATED ART

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple user equipments (UEs). Base stations may communicate with UEs on downstream and upstream links. Base stations may also communicate with each other. In some cases, a UE may desire to communicate directly with another UE via device-to-device communications. However, the UE may first have to discover the other UE. This may be difficult when the UEs operate asynchronously with respect to one another.

SUMMARY

The described features generally relate to one or more improved methods, systems, apparatuses, and/or devices for forwarding, managing, and/or detecting timing information for device-to-device discovery. In particular, the timing information of a base station may be transmitted to one or more UEs with which it communicates, and the timing information may then be forwarded to one or more UEs operating asynchronously with respect to the base station (e.g., one or more UEs synchronized to other base stations, which other base stations operate asynchronously with respect to the base station transmitting the timing information).

In some embodiments, a method for wireless communications includes receiving, from a base station, timing information for the base station, and transmitting a timing signal comprising the timing information, the timing signal being transmitted during at least one sub-frame reserved for device-to-device discovery.

In some embodiments, an apparatus for wireless communications includes means for receiving, from a base station, timing information for the base station, and means for transmitting a timing signal comprising the timing information, the timing signal being transmitted during at least one sub-frame reserved for device-to-device discovery.

In some embodiments, a method for wireless communications includes transmitting, to a mobile device, timing information for a base station, and transmitting instructions to the mobile device to transmit a timing signal comprising the timing information during at least one sub-frame reserved for device-to-device discovery.

In some embodiments, an apparatus for wireless communications includes a processor, memory in electronic communication with the processor, and instructions stored in the memory. The instructions may be executable by the processor to transmit, to a mobile device, timing information for the apparatus, and transmit instructions to the mobile device to transmit a timing signal including the timing information during at least one sub-frame reserved for device-to-device discovery.

Various embodiments of the methods and/or apparatuses may include the features of, means for, and/or processor-executable instructions for transmitting the timing signal using one or more symbols during a portion of a sub-frame. In some cases, a sub-frame during which the timing signal is transmitted is positioned first among the at least one sub-frame reserved for device-to-device discovery.

Various embodiments of the methods and/or apparatuses may include the features of, means for, and/or processor-executable instructions for receiving, from the base station, instructions to transmit the timing signal, and transmitting the timing signal after the instructions are received.

Various embodiments of the methods and/or apparatuses may include the features of, means for, and/or processor-executable instructions for transmitting the timing signal using one or more symbols at a first frequency during a first portion of a sub-frame, wherein an additional timing signal is transmitted using one or more symbols at a second frequency during a second portion of the sub-frame, the additional timing signal comprising timing information for an additional base station. In some cases, the first frequency is different from the second frequency and the first portion of the sub-frame is different from the second portion of the sub-frame. The base station and the additional base station may be non-neighboring base stations.

Various embodiments of the methods and/or apparatuses may include the features of, means for, and/or processor-executable instructions for transmitting one or more additional copies of the timing signal during the at least one sub-frame reserved for device-to-device discovery. In some cases, the timing information and the timing signal includes a primary synchronization signal transmitted by the base station. The timing information and the timing signal may include a primary synchronization signal and a secondary synchronization signal transmitted by the base station.

Various embodiments of the methods and/or apparatuses may include the features of, means for, and/or processor-executable instructions for transmitting a device-to-device discovery signal during the at least one sub-frame reserved for device-to-device discovery. In some cases, the device-to-device discovery signal is transmitted during a sub-frame that is different from a sub-frame during which the timing signal is transmitted. The timing information may include symbol-level timing information for the base station.

Various embodiments of the methods and/or apparatuses may include the features of, means for, and/or processor-executable instructions for identifying one or more symbols during a portion of a sub-frame, and transmitting instructions to the mobile device to transmit the timing signal using the one or more identified symbols.

Various embodiments of the methods and/or apparatuses may include the features of, means for, and/or processor-executable instructions for transmitting, to at least one other mobile device, the timing information for the base station, and transmitting instructions to a subset of mobile devices, selected from the mobile device and the at least one other mobile device, to transmit the timing signal comprising the timing information during the at least one sub-frame reserved for device-to-device discovery.

Various embodiments of the methods and/or apparatuses may include the features of, means for, and/or processor-executable instructions for applying an extended cyclic prefix to the sub-frame during which the timing signal is transmitted.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The forwarding, managing, and detecting of timing information for device-to-device discovery in a wireless communications system is described. In particular, the timing information of a base station may be transmitted to one or more UEs with which it communicates, and the timing information may then be forwarded to one or more UEs operating asynchronously with respect to the base station (e.g., one or more UEs synchronized to other base stations, which other base stations operate asynchronously with respect to the base station transmitting the timing information).

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
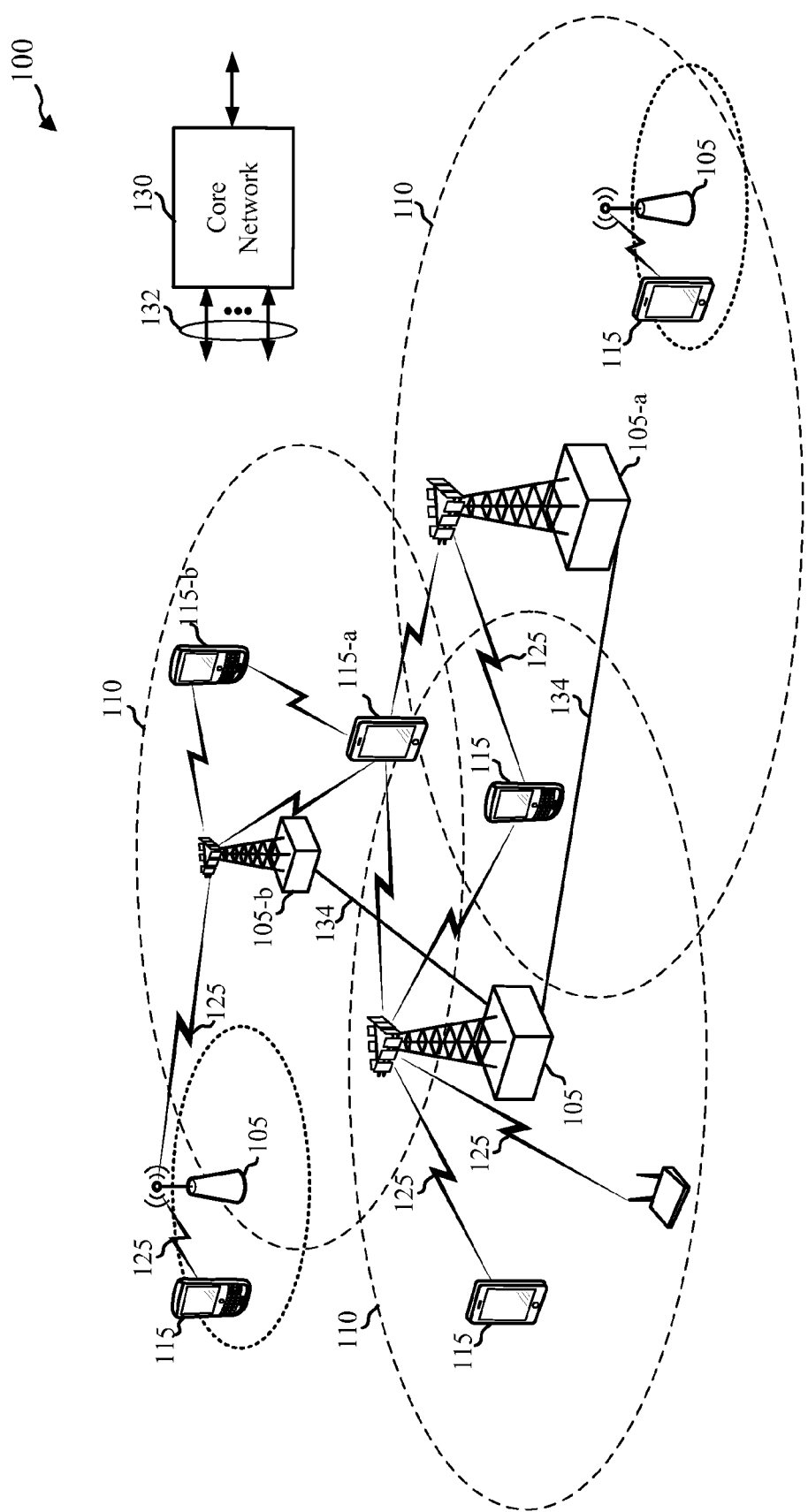
FIG. 1 shows a block diagram of a wireless communications system.

Referring first to FIG. 1, a block diagram illustrates an example of a wireless communications system 100. The system 100 includes base stations (or cells) 105, user equipments (UEs) 115, and a core network 130. The base stations 105 may communicate with the UEs 115 under the control of a base station controller, which may be part of the core network 130 or the base stations 105 in various embodiments. Base stations 105 may communicate control information and/or user data with the core network 130 through backhaul 132. In some embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters may transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective coverage area 110. In some embodiments, a base station 105 may be referred to as a base transceiver station, a radio base station, an access point, a radio transceiver, a basic service set (BSS), an extended service set (ESS), a NodeB, an evolved NodeB (eNodeB or eNB), a Home NodeB, a Home eNodeB, or some other suitable terminology. The coverage area 110 for a base station may be divided into sectors making up only a portion of the coverage area. The system 100 may include base stations 105 of different types (e.g., macro, micro, and/or pico base stations). There may be overlapping coverage areas for different technologies.

In some embodiments, the system 100 may be an LTE/LTE-A network. In LTE/LTE-A networks, the terms evolved Node B (eNB) may be generally used to describe the base stations 105. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 may be dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions.

In some cases, a UE 115-a may operate within the coverage areas 110 of more than one base station 105-a, 105-b. A UE 115-b may also operate within the coverage area 110 of a single base station 105-b. In either case, various UEs (e.g., the UE 115-a and the UE 115-b) may be within close enough proximity to communicate directly via device-to-device communications.

Figure 2:
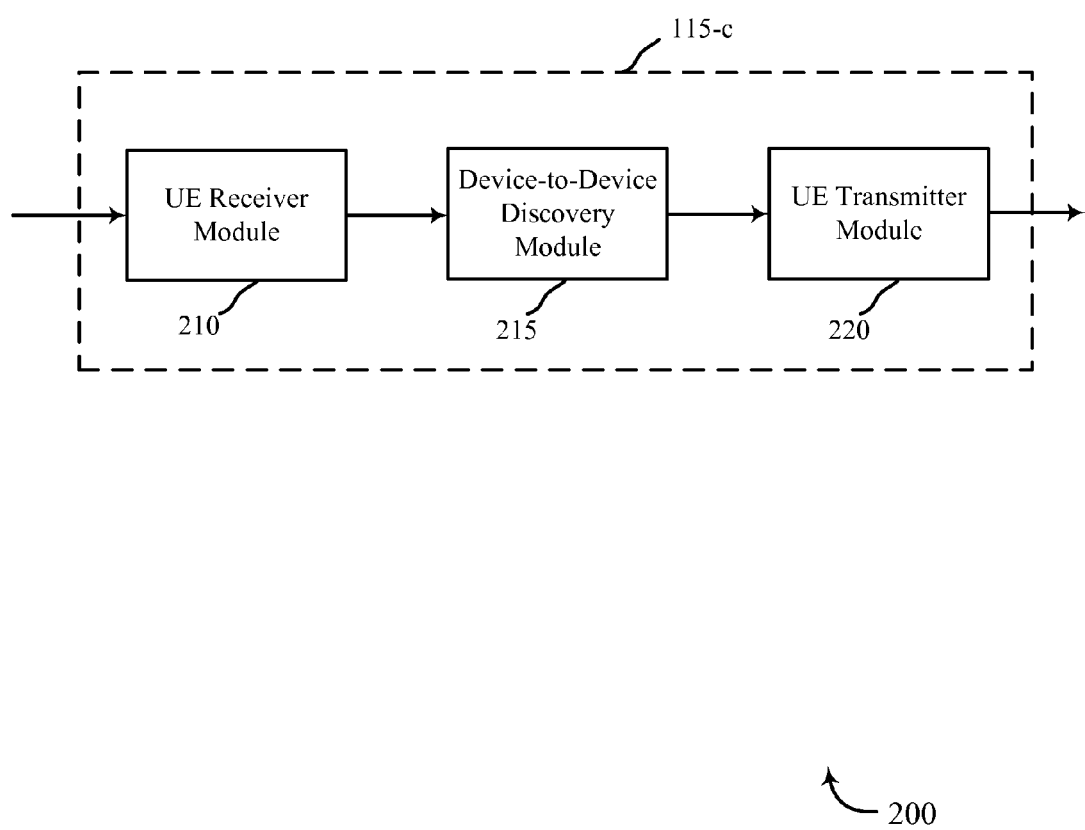
FIGS. 2 and 3 show block diagrams of user equipments for forwarding or detecting timing information for device-to-device discovery, according to various embodiments.

Referring now to FIG. 2, a block diagram 200 illustrates a UE 115-c capable of forwarding and/or detecting timing information for device-to-device discovery, in accordance with various embodiments. The UE 115-c may be an example of one or more aspects of one of the UEs 115 described with reference to FIG. 1. The UE 115-c may also be a processor. The UE 115-c may include a UE receiver module 210, a device-to-device discovery module 215, and/or a UE transmitter module 220. Each of these components may be in communication with each other.

The components of the UE 115-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The UE receiver module 210 may be or include a cellular receiver, such as an LTE/LTE-A receiver. The UE receiver module 210 may be used to receive various types of data and/or control signals (i.e., transmissions) over one or more communication channels of a wireless communications system, such as the wireless communications system 100 described with reference to FIG. 1.

The UE transmitter module 220 may be or include a cellular transmitter, such as an LTE/LTE-A transmitter. The UE transmitter module 220 may be used to transmit various types of data and/or control signals over one or more communication channels of a wireless communications system, such as the wireless communications system 100.

The device-to-device discovery module 215 may perform various functions. In some embodiments, the device-to-device discovery module 215 may forward timing information for device-to-device discovery. More particularly, the device-to-device discovery module 215 may receive, from a base station, timing information for the base station. The timing information may be received using the UE receiver module 210. The base station from which the timing information is received may be an example of one or more aspects of the base stations 105 described with reference to FIG. 1. While or after receiving the timing information, the device-to-device discovery module 215 may transmit a timing signal including the timing information. The timing signal may be transmitted during at least one sub-frame reserved for device-to-device discovery. The timing signal may be transmitted using the UE transmitter module 220. The timing signal may be used, in some embodiments, for timing synchronization for device-to-device discovery in an asynchronous LTE deployment.

In some embodiments, the device-to-device discovery module 215 may detect timing information for device-to-device discovery. More particularly, the device-to-device discovery module 215 may receive, from a serving base station, information indicating a timing of sub-frames reserved for device-to-device discovery by a neighboring base station. The information may be received using the UE receiver module 210. The serving base station from which the information is received may be an example of one or more aspects of the base stations 105 described with reference to FIG. 1. After receiving the information from the serving base station, the device-to-device discovery module 215 may detect a timing signal during at least one of the sub-frames reserved for device-to-device discovery. The timing signal may be detected using the UE receiver module 210. The timing signal may include timing information for the neighboring base station, which timing information may be used to discover a UE serviced by the neighboring base station. The timing information may be used, in some embodiments, for timing synchronization for device-to-device discovery in an asynchronous LTE deployment.

Figure 3:
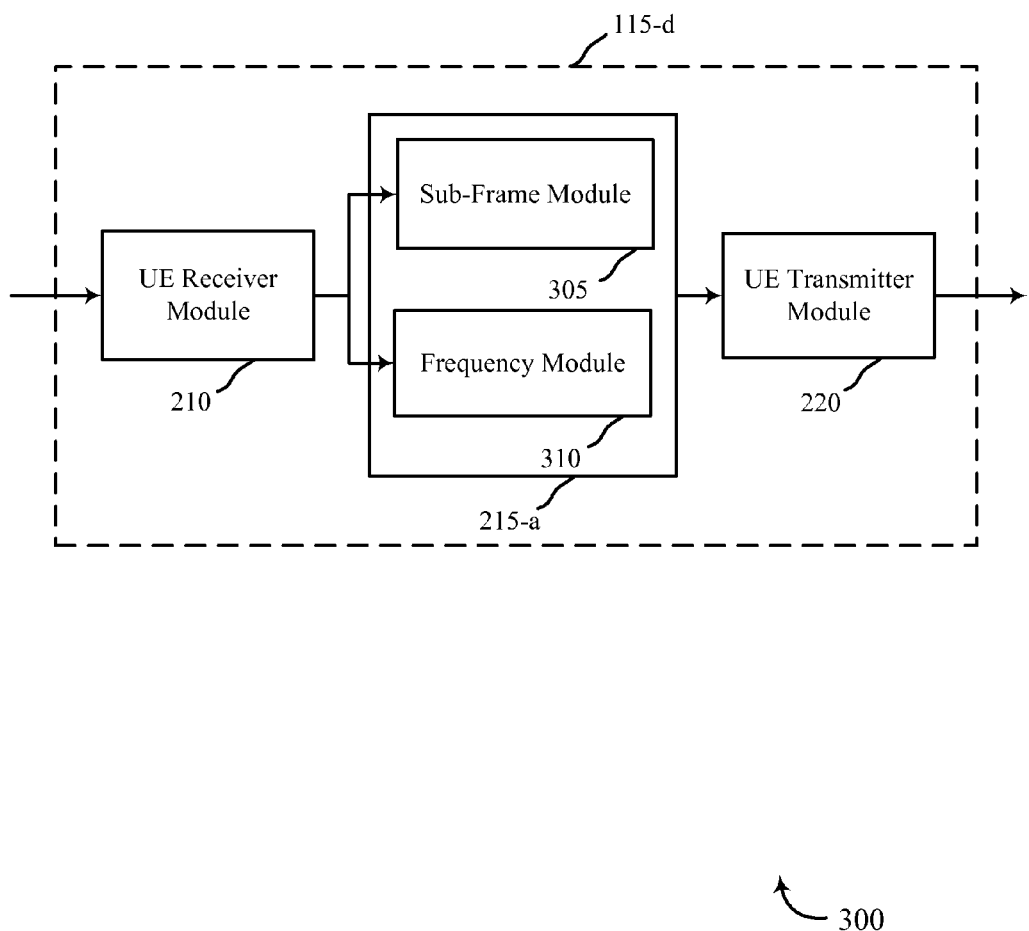

Referring now to FIG. 3, a block diagram 300 illustrates a UE 115-d capable of forwarding and/or detecting timing information for device-to-device discovery, in accordance with various embodiments. The UE 115-d may be an example of one or more aspects of one of the UEs 115 described with reference to FIG. 1. The UE 115-d may also be a processor. The UE 115-d may include a UE receiver module 210, a device-to-device discovery module 215-a, and/or a UE transmitter module 220. Each of these components may be in communication with each other.

The components of the UE 115-d may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The UE receiver module 210 and UE transmitter module 220 may be configured similarly to what is described with respect to FIG. 2. The device-to-device discovery module 215-a may be an example of one or more aspects of the device-to-device discovery module 215-a described with reference to FIG. 2 and may include a sub-frame module 305 and/or a frequency module 310.

In some embodiments, the sub-frame module 305 and frequency module 310 may each receive, from a base station, timing information for the base station. The timing information may in some cases include symbol-level timing information for the base station. The timing information may be received using the UE receiver module 210. The base station from which the timing information is received may be an example of one or more aspects of the base stations 105 described with reference to FIG. 1. The base station may in some cases be a serving base station for the UE 115-d, and the UE 115-d may be synchronized with the base station. The base station may in some cases be associated with a particular cell or coverage area.

While or after receiving the timing information, the sub-frame module 305 and frequency module 310 may assist in preparing a timing signal including the timing information. In some cases, the timing signal may be prepared and/or transmitted after receiving, from the base station, instructions to transmit the timing signal.

The sub-frame module 305 may identify at least one sub-frame reserved for device discovery, such as an uplink or downlink sub-frame, and identify one or more of the sub-frames for transmitting the timing signal. The sub-frame module 305 may also, in some cases, identify one or more symbols on which the timing signal may be transmitted in the one or more sub-frames. In some cases, the sub-frame(s) and/or symbol(s) identified by the sub-frame module 305 may be identified based on information received from the base station (including information in the timing information and/or instructions to transmit the timing signal), or a core network, and/or information pre-programmed into the UE 115-d.

The frequency module 310 may identify at least one frequency at which the timing signal may be transmitted on one or more symbols during a sub-frame. In some cases, the at least one frequency identified by the frequency module 310 may be identified based on information received from the base station (including information in the timing information and/or instructions to transmit the timing signal), or a core network, and/or information pre-programmed into the UE 115-d.

In some cases, the device-to-device discovery module 215-a may prepare and transmit the timing signal on the one or more sub-frames identified by the sub-frame module 305, at the at least one frequency identified by the frequency module 310. The timing signal may be transmitted at some point after receiving the instructions to transmit the timing signal (e.g., immediately after receiving the instructions, after a predetermined or specified delay, or at some specified time). The timing signal may include the timing information received from the base station. The timing signal may be transmitted using the UE transmitter module 220. The timing signal may be used, in some embodiments, for timing synchronization for device-to-device discovery in an asynchronous LTE deployment.

In some embodiments, the sub-frame module 305 and frequency module 310 may each receive, from a base station, information indicating a timing of uplink or downlink sub-frames reserved for device-to-device discovery by a neighboring base station. The information may be received using the UE receiver module 210. The base station from which the timing information is received may be an example of one or more aspects of the base stations 105 described with reference to FIG. 1. The base station may in some cases be a serving base station for the UE 115-d, and the UE 115-d may be synchronized with the base station. The base station may in some cases be associated with a particular cell or coverage area.

After receiving the information from the base station, the sub-frame module 305 and frequency module 310 may assist in detecting a timing signal during at least one of the sub-frames reserved for device-to-device discovery.

The sub-frame module 305 may identify at least one sub-frame during which the timing signal may be detected. The sub-frame module 305 may also, in some cases, identify one or more symbols on which the timing signal may be detected in the at least one sub-frame. In some cases, the sub-frame(s) and/or symbol(s) identified by the sub-frame module 305 may be identified based on the information received from the base station, or a core network, and/or information pre-programmed into the UE 115-d.

The frequency module 310 may identify at least one frequency at which the timing signal may be detected on the one or more symbols during the at least one sub-frame. In some cases, the at least one frequency identified by the frequency module 310 may be identified based on information received from the base station (including, for example, the information indicating the timing of the sub-frames reserved for device-to-device discovery by the neighboring base station).

In some cases, the device-to-device discovery module 215-a may detect the timing signal of the neighboring base station on the one or more symbols of the at least one sub-frame identified by the sub-frame module 305, at the at least one frequency identified by the frequency module 310. The timing signal may include timing information for the neighboring base station, which timing information may be used to discover a UE serviced by the neighboring base station. The timing signal may be used, in some embodiments, for timing synchronization for device-to-device discovery in an asynchronous LTE deployment.

Figure 4:
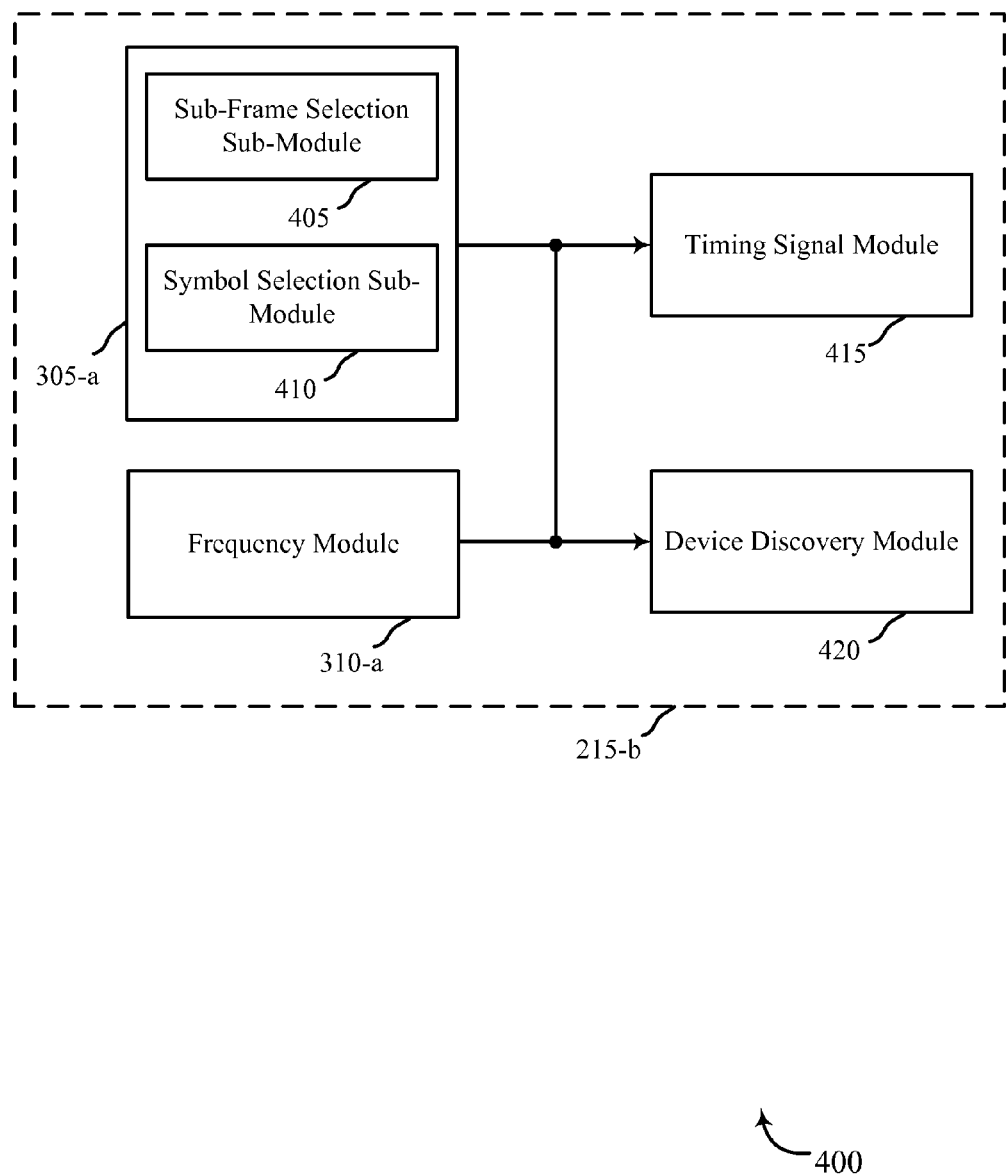
FIG. 4 shows a block diagram of an example of a device-to-device discovery module for forwarding or detecting timing information for device-to-device discovery, according to various embodiments.

Referring now to FIG. 4, a block diagram 400 illustrates one embodiment of a device-to-device discovery module 215-b in accordance with various embodiments. The module 215-b may be an example of one or more aspects of the device-to-device discovery module 215 described with reference to FIGS. 2 and/or 3. The module 215-b may include a sub-frame module 305-a, a frequency module 310-a, a timing signal module 415, and/or a device discovery module 420. Each of these components may be in communication with each other.

The components of the device-to-device discovery module 215-b may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The sub-frame module 305-a and frequency module 310-a may be respective examples of the sub-frame module 305 and frequency module 310 described with reference to FIG. 3. The sub-frame module 305-a may include a sub-frame selection sub-module 405 and/or a symbol selection sub-module 410. Each of these components may be in communication with each other.

In some embodiments, the sub-frame module 305-a and frequency module 310-a may each receive, from a base station, timing information for the base station. The timing information may in some cases include symbol-level timing information for the base station. The base station from which the timing information is received may be an example of one or more aspects of the base stations 105 described with reference to FIG. 1. The base station may in some cases be a serving base station for a UE 115 in which the device-to-device discovery module 215-b is incorporated, and the UE 115 may be synchronized with the base station. The base station may in some cases be associated with a particular cell or coverage area.

While or after receiving the timing information, the sub-frame module 305-a and frequency module 310-a may assist in preparing a timing signal including the timing information. In some cases, the timing signal may be prepared and/or transmitted after receiving, from the base station, instructions to transmit the timing signal.

The sub-frame selection sub-module 405 may be used to identify at least one sub-frame reserved for device discovery, such as an uplink sub-frame or a downlink sub-frame, and identify one or more of the sub-frames for transmitting the timing signal, such as an uplink sub-frame or a downlink sub-frame. In some cases, the identified one or more sub-frames may include a sub-frame positioned first among the at least one sub-frame reserved for device discovery.

The symbol selection sub-module 410 may be used to identify one or more symbols on which the timing signal may be transmitted in the one or more sub-frames identified by the sub-frame selection sub-module. In some cases, the symbol selection sub-module 410 may identify the one or more symbols by identifying a portion of a sub-frame including the one or more symbols. In some cases, the identified portion may be a first portion of the sub-frame, and the one or more symbols on which the timing signal is transmitted may be a first few symbols of the sub-frame. Transmission of the timing signal on a first few symbols of a sub-frame may ensure that the timing signal does not interfere with the timing and/or discovery signals transmitted by devices operating in nearby cells that operate asynchronously with respect to the cell in which a UE 115 incorporating the module 215-b operates, which nearby cells may transmit timing and/or discovery signals in sub-frames that overlap the sub-frame(s) identified by the sub-frame selection sub-module 405.

In some cases, the sub-frame(s) and/or symbol(s) identified by the sub-frame selection sub-module 405 and/or symbol selection sub-module 410 may be identified based on information received from the base station (including information in the timing information and/or instructions to transmit the timing signal), or a core network, and/or information pre-programmed into the device-to-device discovery module 215-b and/or its host device.

The frequency module 310-a may identify at least one frequency at which the timing signal may be transmitted on one or more symbols during a portion of a sub-frame (e.g., a portion of a sub-frame identified by the symbol selection sub-module 410). The identified at least one frequency may in some cases include a first frequency, which first frequency may be used to transmit the timing signal on one or more symbols during a first portion of a sub-frame. The first frequency may be different from a second frequency used to transmit an additional timing signal on one or more symbols during a second portion of the sub-frame. Also, the first portion of the sub-frame may be different from the second portion of the sub-frame. The additional timing signal may be transmitted by a device synchronized with an additional base station, such as a base station to which a UE 115 incorporating the device-to-device discovery module 215-b is not synchronized. The additional timing signal may include timing information for the additional base station, and may be transmitted during the same sub-frame as the timing signal transmitted by the UE 115 incorporating the module 215-b because the additional timing signal is transmitted as part of an additional sub-frame that overlaps the sub-frame in which the UE 115 incorporating the module 215-b transmits a timing signal. In some cases, the base station and the additional base station may be non-neighboring base stations. In some cases, the at least one frequency identified by the frequency module 310-a may be identified based on information received from the base station (including information in the timing information and/or instructions to transmit the timing signal), or a core network, and/or information pre-programmed into the device-to-device discovery module 215-b and/or its host device.

In some embodiments, the timing signal module 415 may prepare and transmit the timing signal on the one or more symbols of the one or more sub-frames identified by the sub-frame module 305-a, at the at least one frequency identified by the frequency module 310-a. The timing signal may include the timing information received from the base station. The timing signal may be transmitted at some point after receiving the instructions to transmit the timing signal (e.g., immediately after receiving the instructions, after a predetermined or specified delay, or at some specified time).

The timing signal may be used, in some embodiments, for timing synchronization for device-to-device discovery in an asynchronous LTE deployment.

In some cases, the timing information and the timing signal may include a primary synchronization signal (PSS) transmitted by the base station. In other cases, the timing information and the timing signal may include both a PSS and a secondary synchronization signal (SSS) transmitted by the base station.

In some cases, one or more additional copies of the timing signal may be transmitted during the one or more sub-frame identified by the sub-frame selection sub-module 405. For example, multiple copies of a timing signal including a PSS transmitted by a base station may be transmitted in back-to-back sub-frames, with each subsequent copy of the timing signal including a repetitive version of the PSS.

In some embodiments, the sub-frame module 305-*a* and frequency module 310-*a* may each receive, from a base station, information indicating a timing of sub-frames reserved for device-to-device discovery by one or more neighboring base stations. The information may be received using the UE receiver module 210. The base station from which the information is received may be an example of one or more aspects of the base stations 105 described with reference to FIG. 1. The base station may in some cases be a serving base station for a UE 115 in which the device-to-device discovery module 215-*b* is incorporated, and the UE 115 may be synchronized with the base station. The base station may in some cases be associated with a particular cell or coverage area.

After receiving the information from the base station, the sub-frame module 305-*a* and frequency module 310-*a* may assist in detecting one or more timing signals during at least one of the sub-frames reserved for device-to-device discovery.

The sub-frame selection sub-module 405 may be used to identify at least one sub-frame, such as an uplink sub-frame or a downlink sub-frame, during which the one or more timing signals may be detected. The symbol selection sub-module 410 may identify one or more symbols on which the timing signal(s) may be detected in the at least one sub-frame. In some cases, the sub-frame(s) and/or symbol(s) identified by the sub-frame selection sub-module 405 and symbol selection sub-module 410 may be identified based on the information received from the base station, or a core network, and/or information pre-programmed into the device-to-device discovery module 215-*b* and/or its host device.

The frequency module 310-*a* may identify at least one frequency at which the timing signal(s) may be detected on the one or more symbols during the at least one sub-frame. In some cases, the at least one frequency identified by the frequency module 310-*a* may be identified based on information received from the base station (including, for example, the information indicating the timing of the sub-frames reserved for device-to-device discovery by the neighboring base station). In some cases, the frequency module 310-*a* may identify a first frequency at which a first timing signal may be detected, and a second frequency at which a second timing signal may be detected. The first timing signal may include timing information for a first neighboring base station, and the second timing signal may include timing information for a second neighboring base station.

In some embodiments, the device discovery module 420 may detect the timing signal(s) of the neighboring base station(s) on the one or more symbols of the at least one sub-frame identified by the sub-frame module 305-*a*, at the at least one frequency identified by the frequency module 310-*a*. The timing signal(s) may include timing information for the neighboring base station(s), which timing information may be used by the device discovery module 420 to discover one or more UEs serviced by the neighboring base station(s). The timing signal discovery may be used, in some embodiments, for timing synchronization for device-to-device discovery in an asynchronous LTE deployment.

Figure 5:
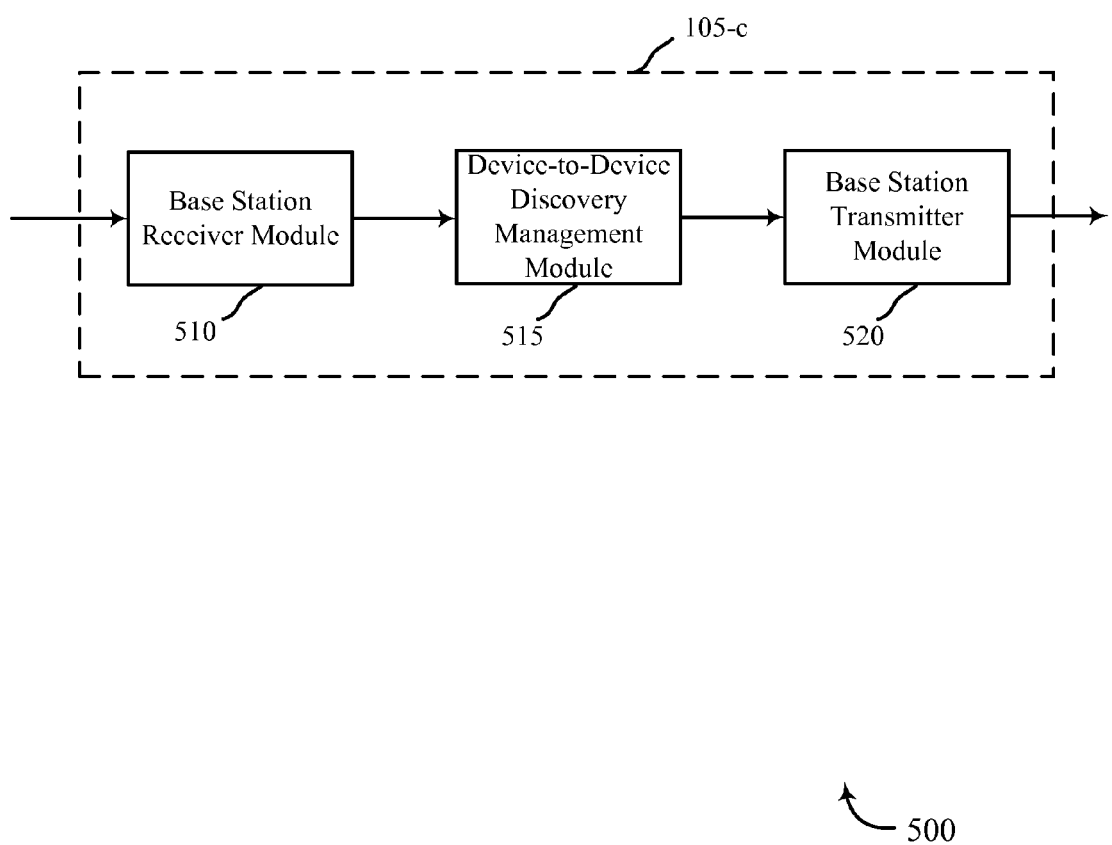
FIGS. 5 and 6 show block diagrams of base stations for managing timing information for device-to-device discovery, according to various embodiments.

Referring now to FIG. 5, a block diagram 500 illustrates a base station 105-*c* capable of managing timing information for device-to-device discovery, in accordance with various embodiments. The base station 105-*c* may be an example of one or more aspects of one of the base stations 105 described with reference to FIG. 1. The base station 105-*c* may also be a processor. The base station 105-*c* may include a base station receiver module 510, a device-to-device discovery management module 515, and/or a base station transmitter module 520. Each of these components may be in communication with each other.

The components of the base station 105-*c* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The base station receiver module 510 may be or include a cellular receiver, such as an LTE/LTE-A receiver. The base station receiver module 510 may be used to receive various types of data and/or control signals (i.e., transmissions) over one or more communication channels of a wireless communications system, such as the wireless communications system 100 described with reference to FIG. 1.

The base station transmitter module 520 may be or include a cellular transmitter, such as an LTE/LTE-A transmitter. The base station transmitter module 520 may be used to transmit various types of data and/or control signals over one or more communication channels of a wireless communications system, such as the wireless communications system 100.

The device-to-device discovery management module 515 may perform various functions. In some embodiments, the device-to-device discovery management module 515 may transmit timing information for the base station 105-*c* to a UE 115. The timing information may be transmitted using the base station transmitter module 520. Before, while, or after transmitting the timing information, the device-to-device discovery management module 515 may transmit instructions to transmit a timing signal including the timing information to the UE 115. The instructions may specify that the timing signal is to be transmitted during at least one sub-frame reserved for device-to-device discovery. The instructions may be transmitted using the base station transmitter module 520. The timing signal may be used, in some embodiments, for timing synchronization for device-to-device discovery in an asynchronous LTE deployment.

Figure 6:
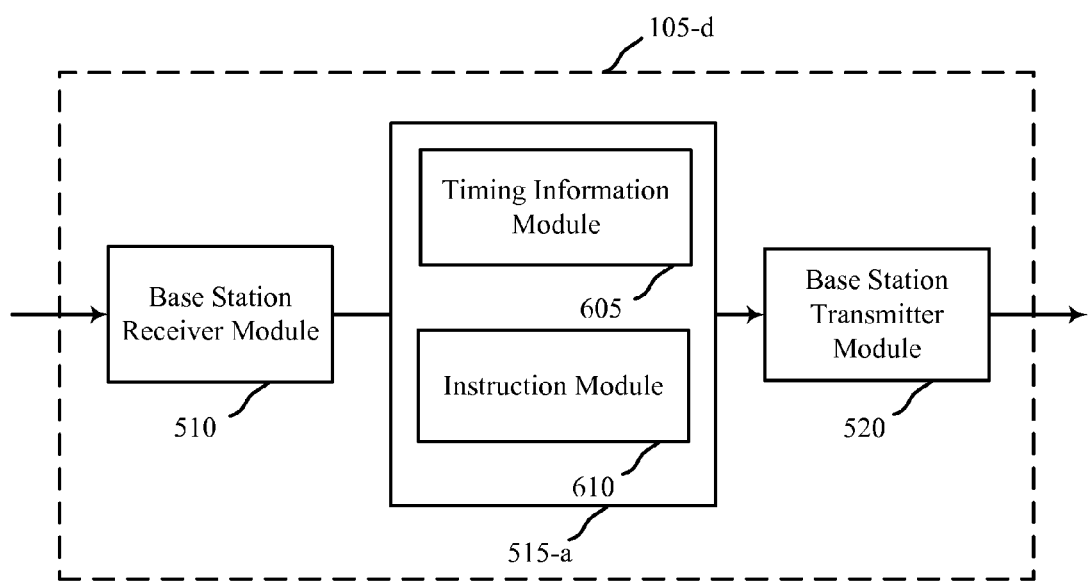

Referring now to FIG. 6, a block diagram 600 illustrates a base station 105-*d* capable of managing timing information for device-to-device discovery, in accordance with various embodiments. The base station 105-*d* may be an example of one or more aspects of one of the base stations 105 described with reference to FIG. 1. The base station 105-*d* may also be a processor. The base station 105-*d* may include a base station receiver module 510, a device-to-device discovery management module 515-*a*, and/or a base station transmitter module 520. Each of these components may be in communication with each other.

The components of the base station 105-*d* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The base station receiver module 510 and base station transmitter module 520 may be configured similarly to what is described with respect to FIG. 5. The device-to-device discovery management module 515-*a* may be an example of one or more aspects of the device-to-device discovery management module 515-*a* described with reference to FIG. 5 and may include a timing information module 605 and/or an instruction module 610.

In some embodiments, the timing information module 605 may select and/or compile timing information for the base station 105-*d* to transmit to a plurality of UEs 115. The timing information may in some cases include symbol-level timing information for the base station 105-*d*. The timing information may be transmitted to the UEs 115 using the base station transmitter module 520.

Before, while, or after transmitting the timing information, the instruction module 610 may transmit instructions to transmit a timing signal including the timing information to at least a subset of the UE 115 to which the timing information was transmitted by the timing information module 605. The instructions may specify that the timing signal is to be transmitted during at least one sub-frame reserved for device-to-device discovery. The instructions may be transmitted using the base station transmitter module 520. The timing signal may be used, in some embodiments, for timing synchronization for device-to-device discovery in an asynchronous LTE deployment.

Figure 7:
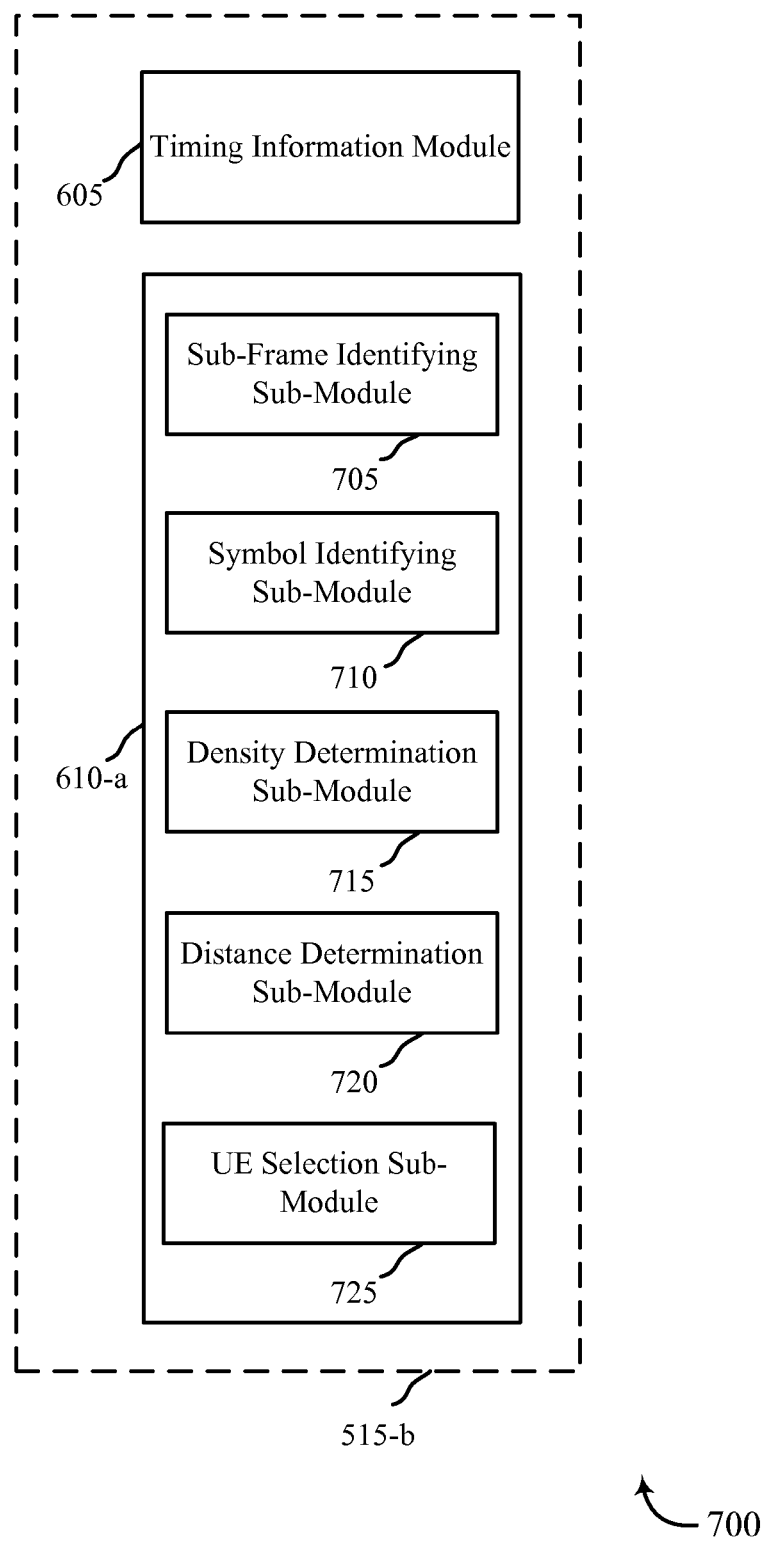
FIG. 7 shows a block diagram of an example of a device-to-device discovery management module for managing timing information for device-to-device discovery, according to various embodiments.

Referring now to FIG. 7, a block diagram 700 illustrates one embodiment of a device-to-device discovery management module 515-*b* in accordance with various embodiments. The device-to-device discovery management module 515-*b* may be an example of one or more aspects of the device-to-device discovery management module 515 described with reference to FIGS. 5 and/or 6. The device-to-device discovery management module 515-*b* may include a timing information module 605 and/or an instruction module 610-*a*. Each of these components may be in communication with each other.

The components of the device-to-device discovery management module 515-*b* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The timing information module 605 may be configured similarly to what is described with respect to FIG. 6. The instruction module 610-*a* may be an example of the instruction module 610 described with reference to FIG. 6. The instruction module 610-*a* may include a sub-frame identifying sub-module 705, a symbol identifying sub-module 710, a density determination sub-module 715, a distance determination sub-module 720, and/or a UE selection sub-module 725. Each of these components may be in communication with each other.

In some embodiments, the sub-frame identifying sub-module 705 may identify at least one sub-frame reserved for device-to-device discovery, such as an uplink sub-frame or a downlink sub-frame. The sub-frame identifying sub-module 705 may also identify one or more of the at least one sub-frame during which a timing signal may be transmitted. The identified one or more sub-frames may in some cases include an sub-frame positioned first among the at least one sub-frame reserved for device-to-device discovery.

In some embodiments, the symbol identifying sub-module 710 may identify one or more symbols during a portion of a sub-frame. The one or more symbols may be used by the UE 115 for transmitting the timing signal. The portion of the sub-frame may in some cases be a first portion of the sub-frame, and the one or more symbols on which the timing signal may be transmitted may be a first few symbols of the sub-frame. Transmission of the timing signal on a first few symbols of a sub-frame may ensure that the timing signal does not interfere with the timing and/or discovery signals transmitted by devices operating in nearby cells that operate asynchronously with respect to the cell in which a base station 105 that incorporates the device-to-device discovery management module 515-*b* operates, which nearby cells may transmit timing and/or discovery signals in sub-frames that overlap the sub-frame during which the timing signal is transmitted by the device-to-device discovery management module 515-*b*.

In some embodiments, the density determination sub-module 715 may determine a density of UEs 115 transmitting to a base station 105 incorporating the device-to-device discovery management module 515-*b*.

In some embodiments, the distance determination sub-module 720 may determine a distance of each of a plurality of UEs from a base station incorporating the device-to-device discovery management module 515-*b*.

The UE selection sub-module 725 may identify or select a subset of the UEs 115 to which the transmission information is transmitted. The subset may be selected based at least in part on the density of the UEs 115 transmitting to the base station 105 and/or the distance of each of the plurality of UEs 115 from the base station 105. This may be helpful to reduce power consumption by, for example, only enabling UEs near a cell or coverage area boundary to forward timing information, and/or to reduce interference (e.g., due to leakage as a result of UEs transmitting timing signals in overlapping sub-frames).

Before, while, or after transmitting the timing information, the instruction module 610-*a* may transmit instructions to transmit a timing signal including the timing information to the subset of UE 115 identified or selected by the UE selection sub-module 725. The instructions may specify that the timing signal is to be transmitted during one or more symbols of one or more sub-frames identified by the sub-frame identifying sub-module 705 and the symbol identifying sub-module 710. The timing signal may be used, in some embodiments, for timing synchronization for device-to-device discovery in an asynchronous LTE deployment.

Figure 8:
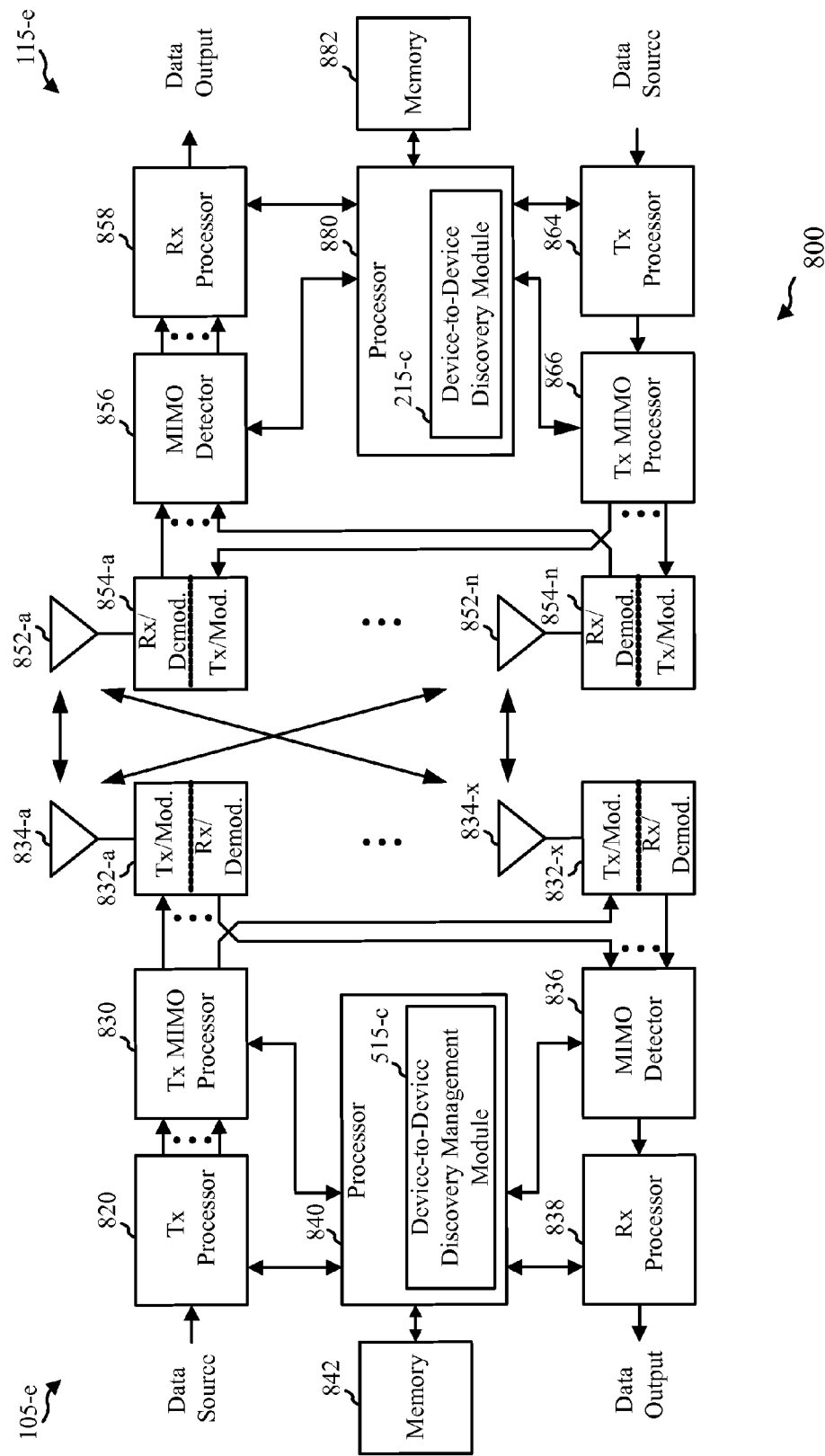
FIG. 8 shows a block diagram that illustrates an example of a multiple-input multiple-output (MIMO) communications system according to various embodiments.

FIG. 8 is a block diagram of a MIMO communication system 800 including a base station 105-*e* and a UE 115-*e*. This system 800 may be an example of one or more aspects of the system 100 described with reference to FIG. 1. The UE 115-*e* may be one example of the UE 115 described in relation to FIGS. 1, 2, 3, and/or 4. The base station 105-*e* may be equipped with antennas 834-*a* through 834-*x*, and the UE 115-*e* may be equipped with antennas 852-*a* through 852-*n*. In the system 800, the base station 105-*e* may be able to send data over multiple communication links at the same time. Each communication link may be called a "layer", and the "rank" of the communication link may indicate the number of layers used for communication. For example, in a 2×2 MIMO system where base station 105-*e* transmits two "layers," the rank of the communication link between the base station 105-*e* and the UE 115-*e* is two.

At the base station 105-*e*, a transmit processor 820 may receive data from a data source. The transmit processor 820 may process the data. The transmit processor 820 may also generate control symbols and/or reference symbols. A transmit (TX) MIMO processor 830 may perform spatial processing (e.g., precoding) on data symbols, control symbols, and/or reference symbols, if applicable, and may provide output symbol streams to the transmit modulators 832-*a* through 832-*x*. Each modulator 832 may process a respective output symbol stream (e.g., for OFDM, etc.) to obtain an output sample stream. Each modulator 832 may further process (e.g., convert to analog, amplify, filter, and upconvert) the output sample stream to obtain a DL signal. In one example, DL signals from modulators 832-*a* through 832-*x* may be transmitted via the antennas 834-*a* through 834-*x*, respectively.

At the UE 115-*e*, the UE antennas 852-*a* through 852-*n* may receive the DL signals from the base station 105-*c* and may provide the received signals to the demodulators 854-*a* through 854-*n*, respectively. Each demodulator 854 may condition (e.g., filter, amplify, downconvert, and digitize) a respective received signal to obtain input samples. Each demodulator 854 may further process the input samples (e.g., for OFDM, etc.) to obtain received symbols. A MIMO detector 856 may obtain received symbols from all the demodulators 854-*a* through 854-*n*, perform MIMO detection on the received symbols, if applicable, and provide detected symbols. A receive processor 858 may process (e.g., demodulate, deinterleave, and decode) the detected symbols, providing decoded data for the UE 115-*e* to a data output, and provide decoded control information to a processor 880, or memory 882.

The processor 880 may in some cases execute stored instructions to instantiate a device-to-device discovery module 215-*c*. In some embodiments, the device-to-device discovery module 215-*c* may be an example of one or more aspects of the device-to-device discovery module 215 described with reference to FIGS. 2, 3, and/or 4.

On the uplink (UL), at the UE 115-*e*, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulators 854-*a* through 854-*n* (e.g., for SC-FDMA, etc.), and be transmitted to the base station 105-*e* in accordance with the transmission parameters received from the base station 105-*e*. At the base station 105-*c*, the UL signals from the UE 115-*e* may be received by the antennas 834, processed by the demodulators 832, detected by a MIMO detector 836 if applicable, and further processed by a receive processor. The receive processor 838 may provide decoded data to a data output and to the processor 840.

The processor 840 may in some cases execute stored instructions to instantiate a device-to-device discovery management module 515-*c*. In some embodiments, the device-to-device discovery management module 515-*c* may be an example of one or more aspects of the device-to-device discovery management module 515 described with reference to FIGS. 5, 6, and/or 7.

The components of the UE 115-*e* may, individually or collectively, be implemented with one or more ASICs adapted to perform some or all of the applicable functions in hardware. Each of the noted modules may be a means for performing one or more functions related to operation of the system 800. Similarly, the components of the base station 105-*e* may, individually or collectively, be implemented with one or more ASICs adapted to perform some or all of the applicable functions in hardware. Each of the noted components may be a means for performing one or more functions related to operation of the system 800.

Figure 9:
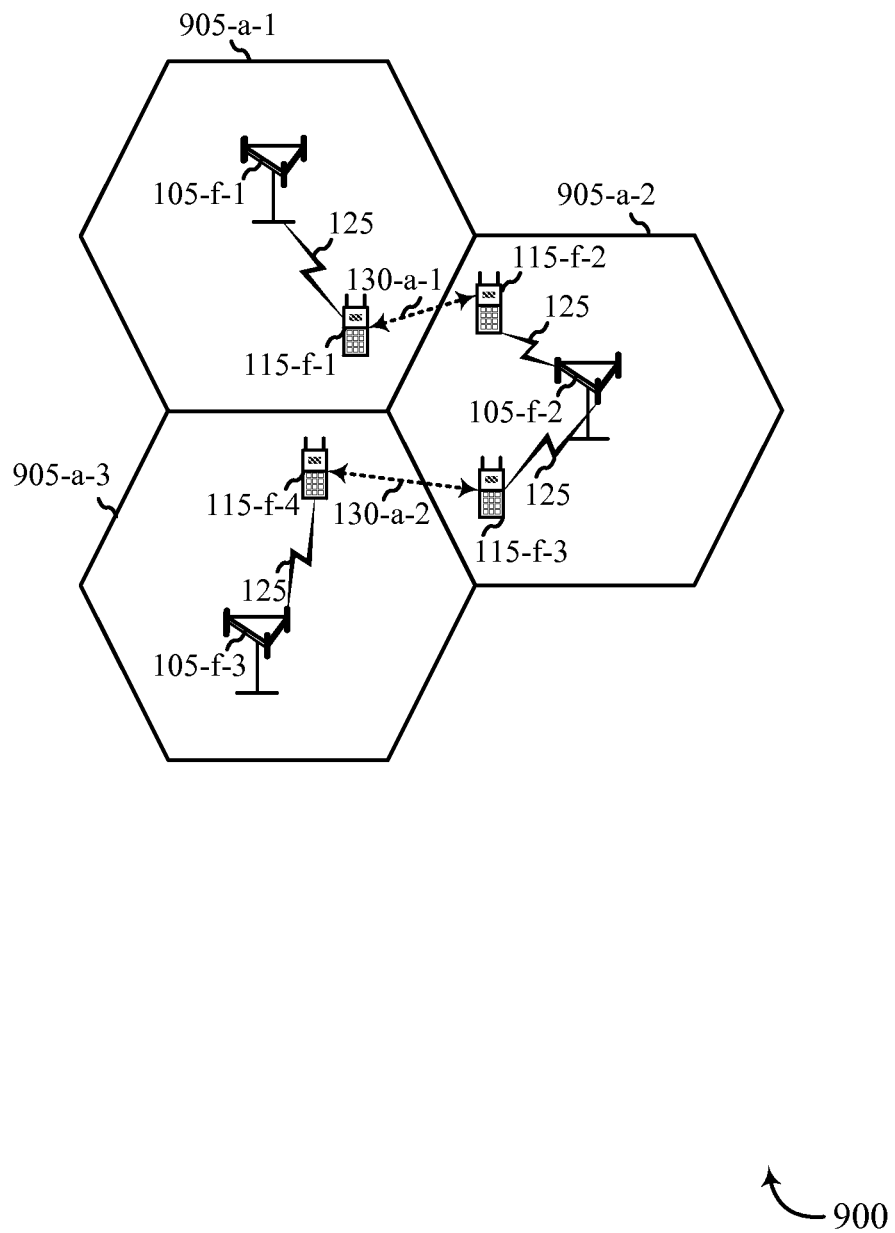
FIG. 9 shows another block diagram of a wireless communications system according to various embodiments.

Referring to FIG. 9, a block diagram illustrates an example of a wireless communications system 900. The system 900 may include a plurality of base stations 105-*f* in communication with various ones of a plurality of UEs 115-*f* over a plurality of communication links 125. Each of the base stations 105-*f* may have a corresponding coverage area 905-*a* defining a cell of the wireless communications system 900. The system 900 may in some cases be a multi-carrier LTE network, and in some cases may be an example of one or more aspects of the wireless communications system 100 described with reference to FIG. 1. The base stations 105-*f* may be examples of the base stations 105 described with reference to FIGS. 1, 5, 6, 7, and/or 8, and the UEs 115 may be examples of the UEs described with reference to FIGS. 1, 2, 3, 4, and/or 8.

In one mode of operation of the system 900, a UE 115-*f*-3 having base station 105-*f*-2 as its serving base station may be located close to the edge of the coverage area 905-*a*-2 of the base station 105-*f*-2, and may therefore be detectable by the UE 115-*f*-4 having base station 105-*f*-3 as its serving base station. For the UE 115-*f*-4 to discover the UE 115-*f*-3, the UE 115-*f*-4 may need to know which sub-frames have been reserved for device-to-device discovery by the base station 105-*f*-2. In some cases, this information may be forwarded to UE 115-*f*-4 via base station 105-*f*3. The UE 115-*f*-3 may also need to know the symbol level timing used by the base station 105-*f*-2. In some cases, the symbol level timing may be learned by detecting a PSS and/or SSS transmitted by the base station 105-*f*-2. However, the PSS and/or SSS may only be decoded up to about −8 decibels (dB). Thus, when the UE 115-*f*-4 is close to the base station 105-*f*-3 and/or signal fading occurs, the UE 115-*f*-4 may not be able to decode the symbol level timing of the base station 105-*f*-2.

In another mode of operation of the system 900, the base station 105-*f*-2 may transmit timing information, such as symbol level timing information, to one or more of the UEs 115-*f*-2, 115-*f*-3 for which it is the serving base station. Each of the UEs 115-*f*-2, 115-*f*-3 may then forward the timing information for device-to-device discovery. In this manner, the UE 115-*f*-1 operating within the coverage area 905-*a*-1 of the base station 105-*f*-1 may receive timing information for the neighboring base station 105-*f*-2 via the UE 115-*f*-2 (over device-to-device communication link 130-*a*-1), and the UE 115-*f*-4 may receive timing information for the neighboring base station 105-*f*-2 via the UE 115-*f*-3 (over device-to-device communication link 130-*a*-2).

Figure 10:
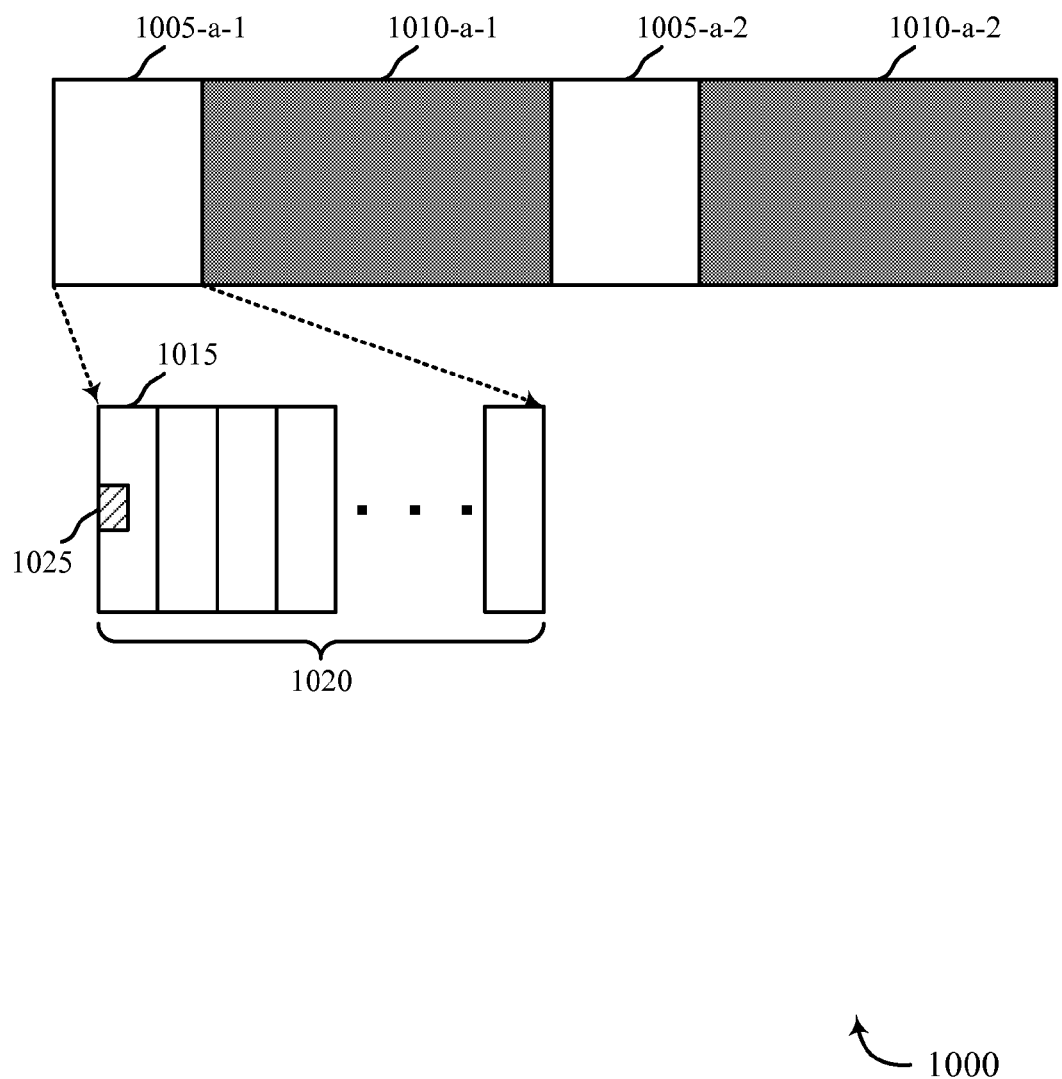
FIG. 10 shows a timing diagram between a UE and a base station.

FIG. 10 illustrates a timing diagram 1000 for an uplink between a UE and a base station. The UE may be an example of one of the UEs 115 described with reference to FIG. 1, 2, 3, 4, and/or 8, and the base station 105 may be an example of one of the base stations 105 described with reference to FIGS. 1, 5, 6, 7, and/or 8. The uplink may include periods 1005-*a*-1, 1005-*a*-2 in which uplink sub-frames are reserved for device-to-device discovery, separated by periods 1010-*a*-1, 1010-*a*-2 in which various transmissions may be made between the UE and its serving base station and/or between the UE and one or more other UEs (e.g., as device-to-device transmissions).

As shown, a period 1005-*a*-1 in which uplink sub-frames are reserved for device-to-device discovery may include at least one uplink sub-frame 1015. In some cases, the period 1005-*a*-1 may include a plurality of uplink sub-frames 1020 reserved for device-to-device discovery. In at least one of the uplink sub-frames reserved for device-to-device discovery, the UE may transmit a timing signal 1025 including timing information received from the base station. In some cases, the timing signal 1025 may be transmitted in a first few symbols of an uplink sub-frame positioned first among a plurality of uplink sub-frames 1020. In some cases, the timing signal 1025 may be transmitted in at least one uplink sub-frame reserved solely for forwarding timing information.

It should be noted, in some cases FIG. 10 may illustrate a timing diagram 1000 for a downlink between a base station and a UE.

Figure 11:
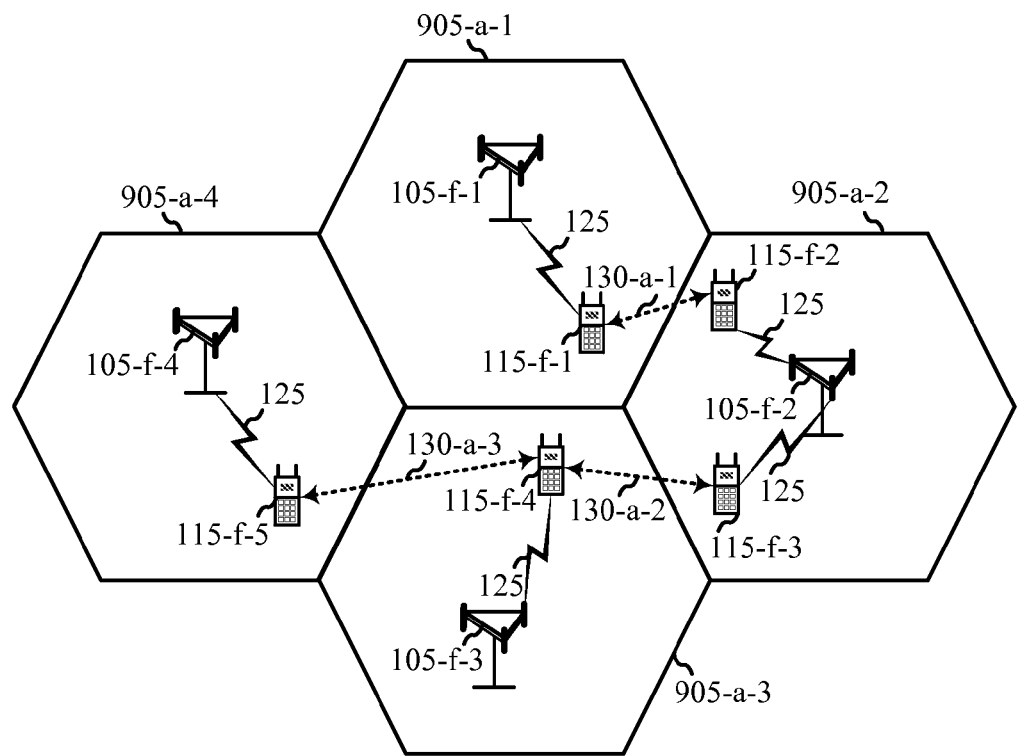
FIG. 11 shows yet another block diagram of a wireless communications system according to various embodiments.

Referring to FIG. 11, a block diagram illustrates an example of a wireless communications system 1100. The system 1100 may include a plurality of base stations 105-*f* in communication with various ones of a plurality of UEs 115-*f* over a plurality of communication links 125. Each of the base stations 105-*f* may have a corresponding coverage area 905-*a* defining a cell of the wireless communications system 1100. The system 1100 may in some cases be a multi-carrier LTE network, and in some cases may be an example of one or more aspects of the wireless communications system 100 and/or 900 described with reference to FIGS. 1 and/or 9. The base stations 105-*f* may be examples of the base stations 105 described with reference to FIGS. 1, 5, 6, 7, and/or 8, and the UEs 115 may be examples of the UEs described with reference to FIGS. 1, 2, 3, 4, and/or 8.

In one mode of operation of the system 1100, each of the base stations 105-*f* may transmit timing information, such as symbol level timing information, to one or more of the UEs 115-*f* for which it is the serving base station. Each of the UEs 115-*f* may then forward the timing information for device-to-device discovery. In this manner, the UE 115-*f*-4 may receive timing information for the neighboring base stations 105-*f*-2 and 105-*f*-4 via the respective UEs 115-*f*-3 and 115-*f*-5 and the respective device-to-device communication links 130-*a*-2 and 130-*a*-3.

Figure 12:
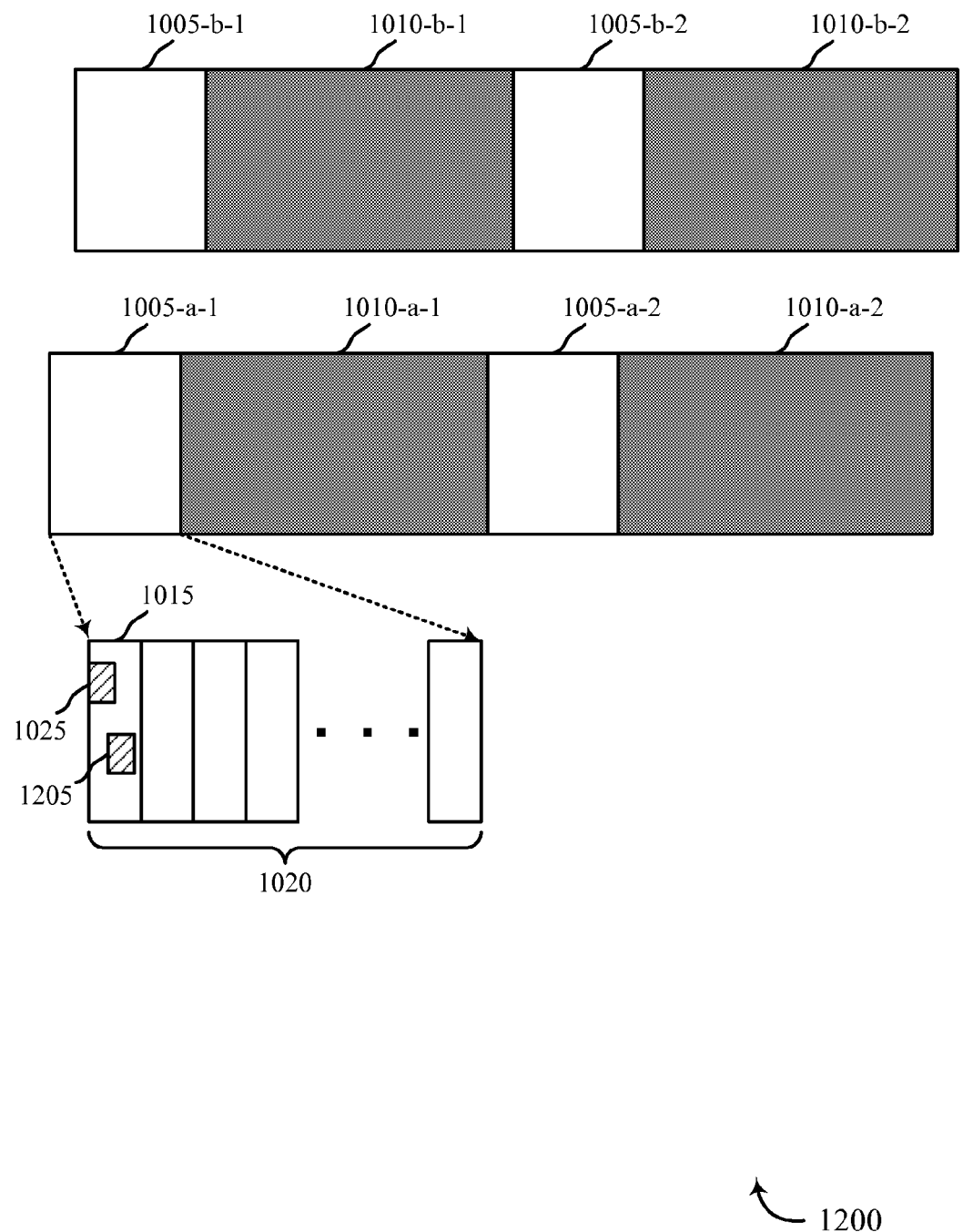
FIG. 12 shows a timing diagram between different combinations of UEs and base stations.

FIG. 12 is a timing diagram 1200 for uplinks between different combinations of UEs and base stations. The UEs may be examples of the UEs 115 described with reference to FIGS. 1, 2, 3, 4, and/or 8, and the base stations 105 may be examples of the base stations 105 described with reference to FIGS. 1, 5, 6, 7, and/or 8. The uplink shown at the bottom of FIG. 12 may include periods 1005-*a*-1, 1005-*a*-2 in which uplink sub-frames are reserved for device-to-device discovery by a first UE, separated by periods 1010-*a*-1, 1010-*a*-2 in which various transmissions may be made between the first UE and a first serving base station and/or between the first UE and one or more other UEs (e.g., as device-to-device transmissions). Similarly, the uplink shown at the top of FIG. 12 may include periods 1005-*b*-1, 1005-*b*-2 in which uplink sub-frames are reserved for device-to-device discovery by a second UE, separated by periods 1010-*b*-1, 1010-*b*-2 in which various transmissions may be made between the second UE and a second serving base station and/or between the second UE and one or more other UEs (e.g., as device-to-device transmissions).

As shown, a period 1005-*a*-1 in which uplink sub-frames are reserved for device-to-device discovery may include at least one uplink sub-frame 1015. In some cases, the period 1005-*a*-1 may include a plurality of uplink sub-frames 1020 reserved for device-to-device discovery. In at least one of the uplink sub-frames reserved for device-to-device discovery, the first UE may transmit a first timing signal 1025 including timing information received from the first serving base station. In some cases, the first timing signal 1025 may be transmitted in a first few symbols of an uplink sub-frame positioned first among a plurality of uplink sub-frames 1020. In some cases, the first timing signal 1025 may be transmitted in at least one uplink sub-frame reserved solely for forwarding timing information.

The second UE and second serving base station may have an uplink sub-frame timing that is offset with respect to the uplink sub-frame timing of the first UE and first serving base station. As a result, the second UE may transmit a second timing signal 1205 including timing information received from the second serving base station. Because the second timing signal is offset from the first timing signal, the first timing signal may be transmitted in a first portion of the uplink sub-frame 1015, and the second timing signal may be transmitted in a second portion of the uplink sub-frame 1015. Also, the first timing signal may be transmitted at a first frequency, and the second timing signal may be transmitted at a second frequency. This may enable a UE to detect both of the timing signals and distinguish between them. Such separation should take into account the leakage due to lack of synchronization between the first UE and its serving base station and the second UE and its serving base station.

It should be noted, in some cases FIG. 12 may illustrate a timing diagram 1200 for downlinks between different combinations of base stations and UEs.

Figure 13:
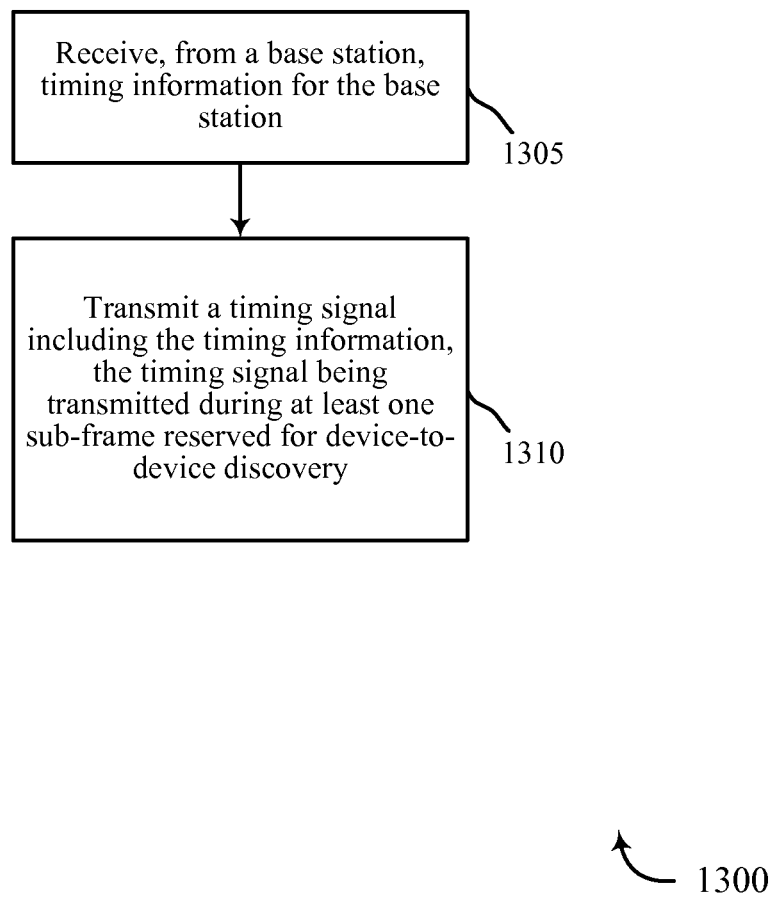
FIGS. 13 and 14 are flowcharts of examples of methods for forwarding timing information for device-to-device discovery according to various embodiments.

FIG. 13 is a flow chart illustrating an example of a method 1300 for forwarding timing information for device-to-device discovery. For clarity, the method 1300 is described below with reference to one of the UEs 115 described with reference to FIGS. 1, 2, 3, 4, 8, 9, and/or 11 and one of the base stations 105 described with reference to FIGS. 1, 5, 6, 7, 8, 9, and/or 11. In one embodiment, a UE 115 may execute one or more sets of codes to control the functional elements of the UE 115 to perform the functions described below.

At block 1305, timing information for a base station 105 may be received from the base station 105. The timing information may in some cases include symbol-level timing information for the base station 105. The base station 105 may in some cases be a serving base station for a device (e.g., a UE 115) performing the method 1300, and the device may be synchronized with the base station 105. The base station 105 may in some cases be associated with a particular cell or coverage area.

At block 1310, a timing signal including the timing information may be transmitted. The timing signal may be transmitted during at least one sub-frame reserved for device-to-device discovery. In some cases, the timing signal may be transmitted during a sub-frame that is positioned first among the at least one sub-frame reserved for device-to-device discovery. In some cases, the timing signal may be transmitted on one or more symbols during a portion of the sub-frame. The portion of the sub-frame may in some cases be a first portion of the sub-frame, and the one or more symbols on which the timing signal is transmitted may be a first few symbols of the sub-frame. Transmission of the timing signal on a first few symbols of a sub-frame may ensure that the timing signal does not interfere with the timing and/or discovery signals transmitted by devices operating in nearby cells that operate asynchronously with respect to the cell in which the base station 105 transmitting the timing information and the device (e.g., UE 115) performing the method 1300 operate, which nearby cells may transmit timing and/or discovery signals in sub-frames that overlap the sub-frame during which the timing signal is transmitted by the device performing the method 1300.

In some cases, the timing information and the timing signal may include a PSS transmitted by the base station 105. In other cases, the timing information and the timing signal may include both a PSS and an SSS transmitted by the base station 105.

The operation(s) at block 1305 and/or 1310 may in some cases be performed using the device-to-device discovery module 215 described with reference to FIGS. 2, 3, 4, and/or 8.

Thus, the method 1300 may provide for forwarding timing information for device-to-device discovery. It should be noted that the method 1300 is just one implementation and that the operations of the method 1300 may be rearranged or otherwise modified such that other implementations are possible. The method 1300 may be used, in some embodiments, for timing synchronization for device-to-device discovery in asynchronous LTE deployments.

Figure 14:
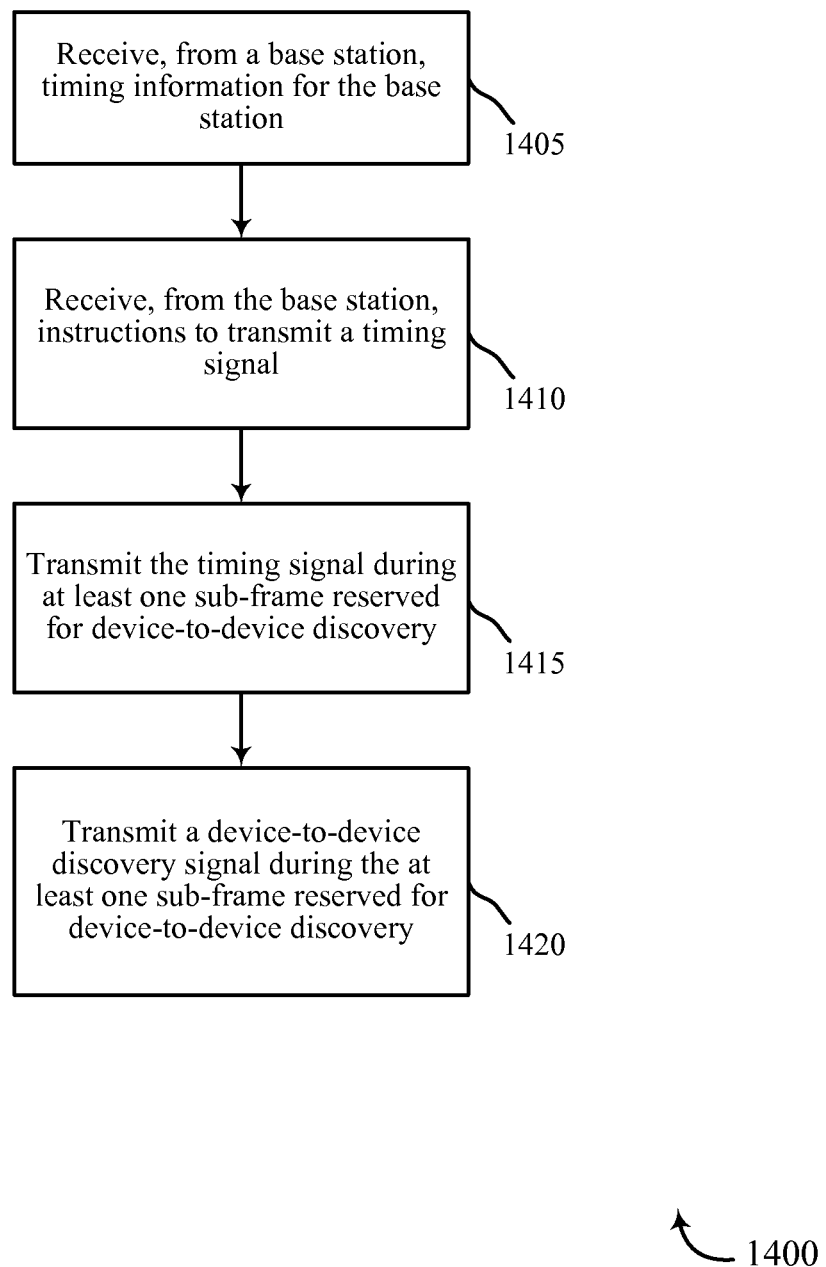

FIG. 14 is a flow chart illustrating another example of a method 1400 for forwarding timing information for device-to-device discovery. For clarity, the method 1400 is described below with reference to one of the UEs 115 described with reference to FIGS. 1, 2, 3, 4, 8, 9, and/or 11 and one of the base stations 105 described with reference to FIGS. 1, 5, 6, 7, 8, 9, and/or 11. In one embodiment, a UE 115 may execute one or more sets of codes to control the functional elements of the UE 115 to perform the functions described below.

At block 1405, timing information for a base station 105 may be received from the base station 105. The timing information may in some cases include symbol-level timing information for the base station 105. The base station 105 may in some cases be a serving base station for a device (e.g., a UE 115) performing the method 1400, and the device may be synchronized with the base station 105. The base station 105 may in some cases be associated with a particular cell or coverage area.

At block 1410, instructions to transmit a timing signal may be received from the base station 105.

At block 1415, and at some point after receiving the instructions to transmit the timing signal (e.g., immediately after receiving the instructions, after a predetermined or specified delay, or at some specified time), the timing signal may be transmitted. The timing signal may include the timing information received from the base station 105. The timing signal may be transmitted during at least one sub-frame reserved for device-to-device discovery. In some cases, the timing signal may be transmitted during a sub-frame that is positioned first among the at least one sub-frame reserved for device-to-device discovery. In some cases, the timing signal may be transmitted on one or more symbols during a portion of the sub-frame. The portion of the sub-frame may in some cases be a first portion of the sub-frame, and the one or more symbols on which the timing signal is transmitted may be a first few symbols of the sub-frame. Transmission of the timing signal on the first few symbols of a sub-frame may ensure that the timing signal does not interfere with the timing and/or discovery signals transmitted by devices operating in nearby cells that operate asynchronously with respect to the cell in which the base station 105 transmitting the timing information and the device (e.g., UE 115) performing the method 1400 operate, which nearby cells may transmit timing and/or discovery signals in sub-frames that overlap the sub-frame during which the timing signal is transmitted by the device performing the method 1400.

In some cases, the timing signal may be transmitted on one or more symbols, at a first frequency, during a first portion of a sub-frame. An additional timing signal may be transmitted on one or more symbols, at a second frequency, during a second portion of the sub-frame. The first frequency may be different from the second frequency, and the first portion of the sub-frame may be different from the second portion of the sub-frame. The additional timing signal may be transmitted by a device other than a device performing the method 1400, which other device is synchronized with an additional base station (i.e., a base station other than the base station from which the device performing the method 1400 receives timing information at block 1405). The additional timing signal may include timing information for the additional base station. The additional timing signal may be transmitted during the same sub-frame as the timing signal transmitted by the device performing the method 1400 because the additional timing signal is transmitted as part of an additional sub-frame that overlaps the sub-frame in which the device performing the method 1400 transmits a timing signal. In some cases, the base station 105 and the additional base station may be non-neighboring base stations (e.g., the cells defined for the base station 105 and the additional base station may be non-adjacent).

In some cases, the timing information and the timing signal may include a PSS transmitted by the base station 105. In other cases, the timing information and the timing signal may include both a PSS and an SSS transmitted by the base station 105.

In some cases, one or more additional copies of the timing signal may be transmitted during the at least one sub-frame reserved for device-to-device discovery. For example, multiple copies of a timing signal including a PSS transmitted by a base station 105 may be transmitted in back-to-back sub-frames, with each subsequent copy of the timing signal including a repetitive version of the PSS.

At block 1420, a device-to-device discovery signal may be transmitted during the at least one sub-frame reserved for device-to-device discovery. The device-to-device discovery signal may in some cases be transmitted during a sub-frame that is different than a sub-frame during which the timing signal is transmitted.

The operation(s) at block 1405, 1410, 1415, and/or 1420 may in some cases be performed using the device-to-device discovery module 215 described with reference to FIGS. 2, 3, 4, and/or 8.

Thus, the method 1400 may provide for forwarding timing information for device-to-device discovery. It should be noted that the method 1400 is just one implementation and that the operations of the method 1400 may be rearranged or otherwise modified such that other implementations are possible. The method 1400 may be used, in some embodiments, for timing synchronization for device-to-device discovery in asynchronous LTE deployments.

Figure 15:
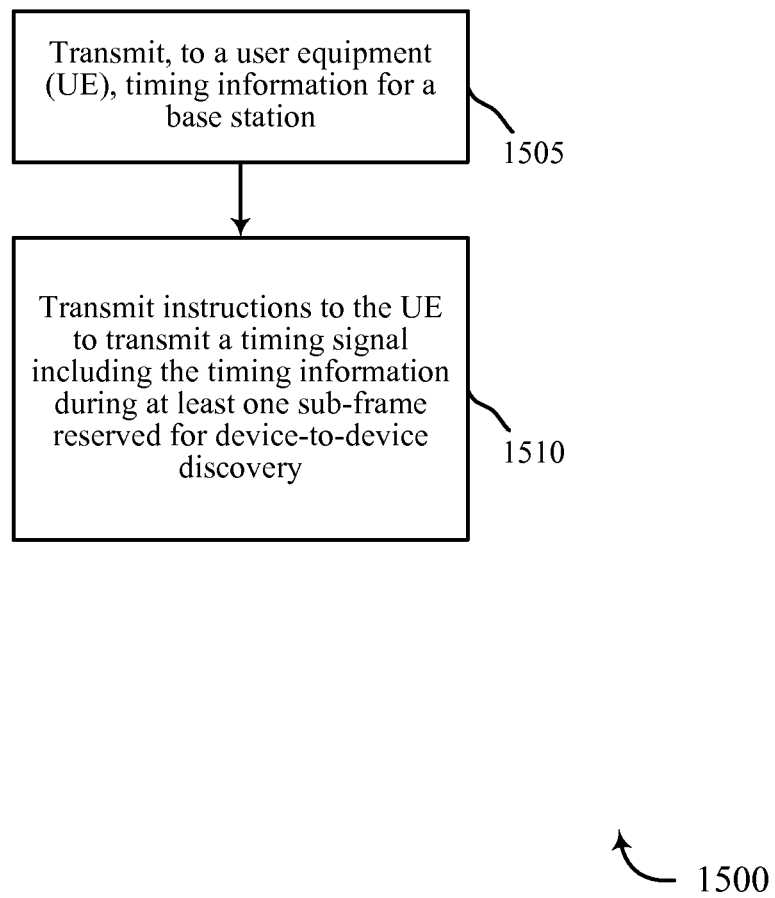
FIGS. 15 and 16 are flowcharts of examples of methods for managing timing information for device-to-device discovery according to various embodiments.

FIG. 15 is a flow chart illustrating an example of a method 1500 for managing timing information for device-to-device discovery. For clarity, the method 1500 is described below with reference to one of the base stations 105 described with reference to FIGS. 1, 5, 6, 7, 8, 9, and/or 11 and one of the UEs 115 described with reference to FIGS. 1, 2, 3, 4, 8, 9, and/or 11. In one embodiment, a base station 105 may execute one or more sets of codes to control the functional elements of the base station 105 to perform the functions described below.

At block 1505, timing information for a base station 105 may be transmitted to a UE 115. The timing information may in some cases include symbol-level timing information for the base station 105. The base station 105 may in some cases be a serving base station for the UE 115, and the UE 115 may be synchronized with the base station 105. The base station 105 may in some cases be associated with a particular cell or coverage area.

At block 1510, instructions to transmit a timing signal including the timing information may be transmitted to the UE 115. The instructions may specify that the timing signal is to be transmitted during at least one sub-frame reserved for device-to-device discovery. In some cases, the instructions may specify transmission of the timing signal during a sub-frame positioned first among the at least one sub-frame reserved for device-to-device discovery.

In some cases, the timing information and the timing signal may include a PSS transmitted by the base station 105. In other cases, the timing information and the timing signal may include both a PSS and an SSS transmitted by the base station 105.

The operation(s) at block 1505 and/or 1510 may in some cases be performed using the device-to-device discovery management module 515 described with reference to FIGS. 5, 6, 7, and/or 8.

Thus, the method 1500 may provide for forwarding timing information for device-to-device discovery. It should be noted that the method 1500 is just one implementation and that the operations of the method 1500 may be rearranged or otherwise modified such that other implementations are possible. The method 1500 may be used, in some embodiments, for timing synchronization for device-to-device discovery in asynchronous LTE deployments.

Figure 16:
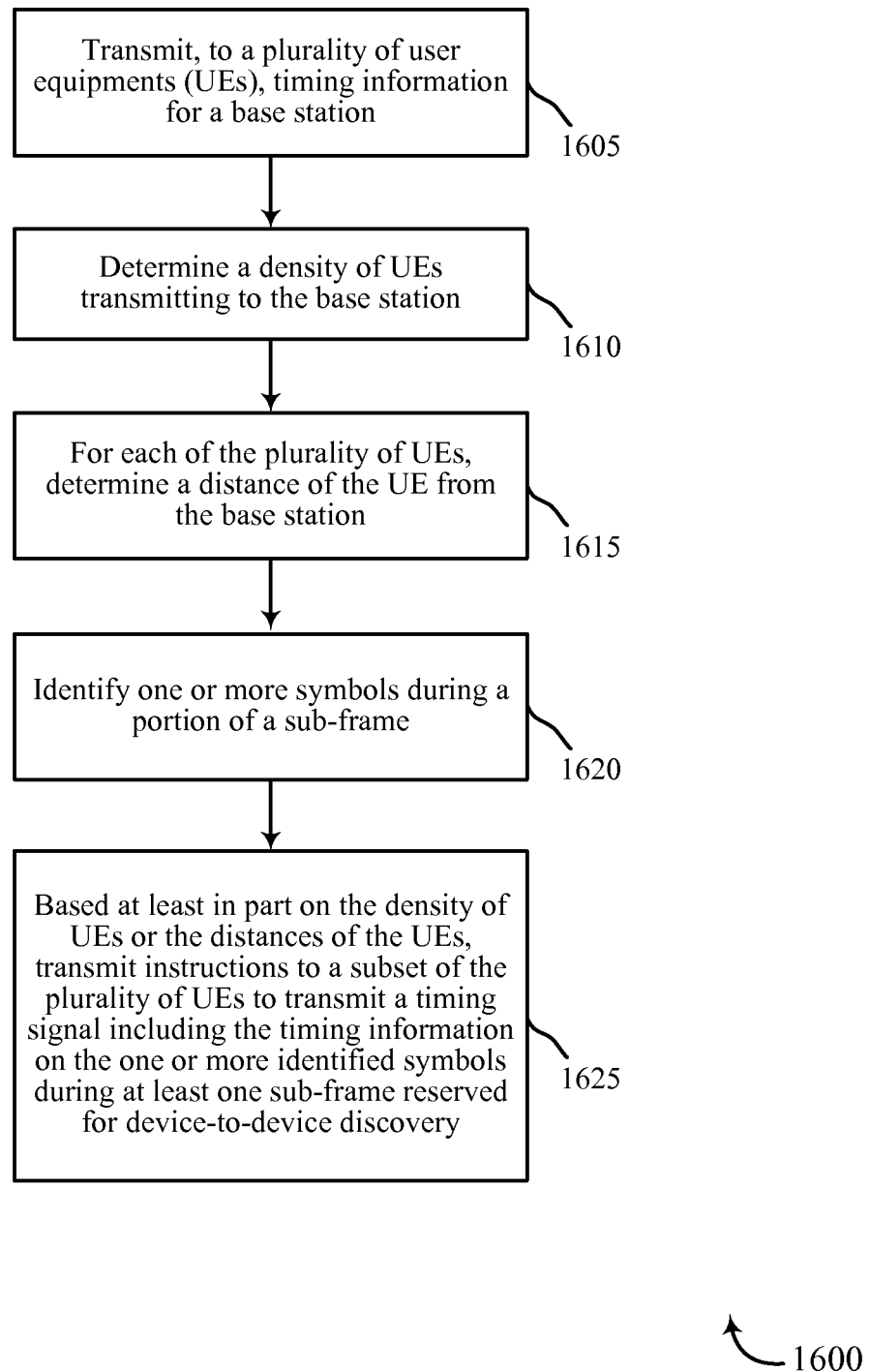

FIG. 16 is a flow chart illustrating an example of a method 1600 for managing timing information for device-to-device discovery. For clarity, the method 1600 is described below with reference to one of the base stations 105 described with reference to FIGS. 1, 5, 6, 7, 8, 9, and/or 11 and one of the UEs 115 described with reference to FIGS. 1, 2, 3, 4, 8, 9, and/or 11. In one embodiment, a base station 105 may execute one or more sets of codes to control the functional elements of the base station 105 to perform the functions described below.

At block 1605, timing information for a base station 105 may be transmitted to a plurality of UEs 115 (e.g., a UE 115 and at least one other UE 115). The timing information may in some cases include symbol-level timing information for the base station 105. The base station 105 may in some cases be a serving base station for the UE 115, and the UE 115 may be synchronized with the base station 105. The base station 105 may in some cases be associated with a particular cell or coverage area.

At block 1610, a density of UEs 115 transmitting to the base station 105 may be determined. At block 1615, a distance of each of the plurality of UEs 115 to the base station 105 may be determined.

At block 1620, one or more symbols during a portion of a sub-frame may be identified. The one or more symbols may be used by the UE 115 for transmitting a timing signal. The portion of the sub-frame may in some cases be a first portion of the sub-frame, and the one or more symbols on which the timing signal may be transmitted may be a first few symbols of the sub-frame. Transmission of the timing signal on a first few symbols of a sub-frame may ensure that the timing signal does not interfere with the timing and/or discovery signals transmitted by devices operating in nearby cells that operate asynchronously with respect to the cell in which the base station 105 and the UE 115 operate, which nearby cells may transmit timing and/or discovery signals in sub-frames that overlap the sub-frame during which the timing signal is transmitted by the UE 115.

At block 1625, instructions to transmit a timing signal including the timing information may be transmitted to a subset of UEs 115 selected from the plurality of UEs 115 to which timing information was transmitted at block 1605. The subset of UEs may be selected, and the instructions transmitted, based at least in part on the density of UEs 115 determined at block 1610 and/or the distances determined at block 1615. This may be helpful to reduce power consumption by, for example, only enabling UEs near a cell or coverage area boundary to forward timing information, and/or to reduce interference (e.g., due to leakage as a result of UEs transmitting timing signals in overlapping sub-frames). The instructions may specify that the timing signal is to be transmitted on the one or more identified symbols during the at least one sub-frame reserved for device-to-device discovery. In some cases, the instructions may specify transmission of the timing signal during a sub-frame positioned first among the at least one sub-frame reserved for device-to-device discovery.

In some cases, the timing information and the timing signal may include a PSS transmitted by the base station 105. In other cases, the timing information and the timing signal may include both a PSS and an SSS transmitted by the base station 105.

In some cases, a base station may be configured to apply an extended cyclic prefix to the sub-frame(s) during which the timing signal is transmitted. This may be helpful to handle higher delay spread when coherent detection is used for a part of the timing signal (e.g., SSS).

The operation(s) at block 1605, 1610, 1615, 1620, and/or 1625 may in some cases be performed using the device-to-device discovery management module 515 described with reference to FIGS. 5, 6, 7, and/or 8.

Thus, the method 1600 may provide for forwarding timing information for device-to-device discovery. It should be noted that the method 1600 is just one implementation and that the operations of the method 1600 may be rearranged or otherwise modified such that other implementations are possible. The method 1600 may be used, in some embodiments, for timing synchronization for device-to-device discovery in asynchronous LTE deployments.

Figure 17:
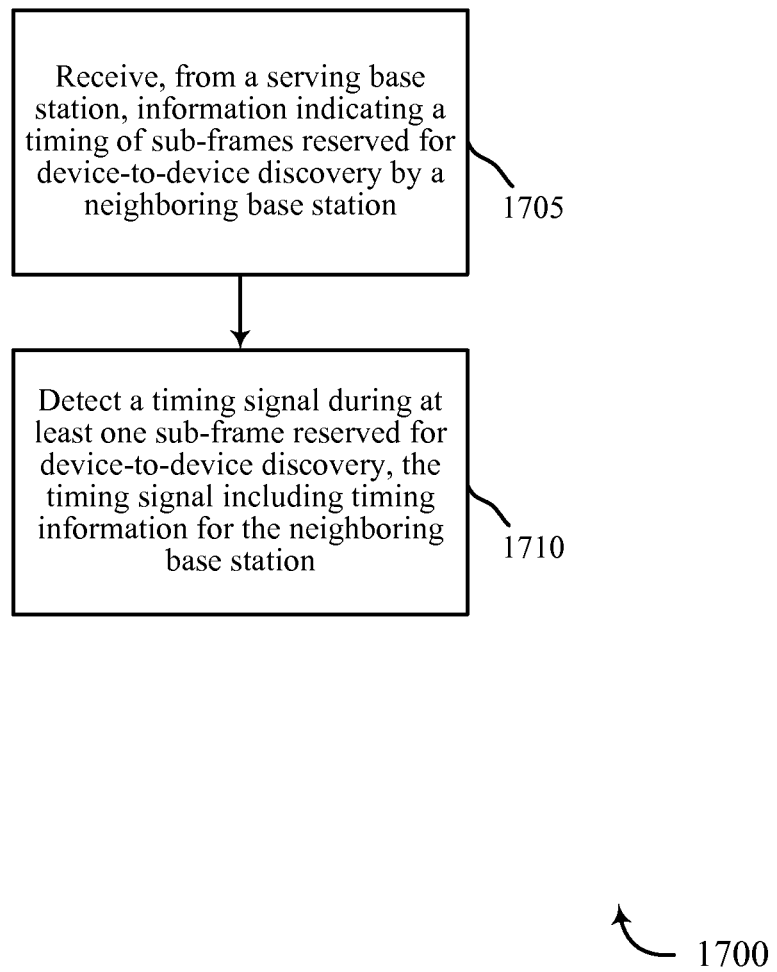
FIGS. 17 and 18 are flowcharts of examples of methods for detecting timing information for device-to-device discovery according to various embodiments.

FIG. 17 is a flow chart illustrating an example of a method 1700 for detecting timing information for device-to-device discovery. For clarity, the method 1700 is described below with reference to multiple ones of the UEs 115 described with reference to FIGS. 1, 2, 3, 4, 8, 9, and/or 11. In one embodiment, a UE 115 may execute one or more sets of codes to control the functional elements of the UE 115 to perform the functions described below.

At block 1705, information indicating a timing of sub-frames reserved for device-to-device discovery by a neighboring base station may be received (e.g., at a UE 115) from a serving base station 105. The device or UE 115 performing the method 1700 may be synchronized with the base station 105. The base station 105 may in some cases be associated with a particular cell or coverage area.

At block 1710, a timing signal including timing information for the neighboring base station may be detected during at least one of the sub-frames reserved for device-to-device discovery. The timing information may in some cases include symbol-level timing information for the neighboring base station.

In some cases, the timing signal may include a PSS transmitted by the neighboring base station. In other cases, the timing signal may include both a PSS and an SSS transmitted by the neighboring base station.

The operation(s) at block 1705 and/or 1710 may in some cases be performed using the device-to-device discovery module 215 described with reference to FIGS. 2, 3, 4, and/or 8.

Thus, the method 1700 may provide for forwarding timing information for device-to-device discovery. It should be noted that the method 1700 is just one implementation and that the operations of the method 1700 may be rearranged or otherwise modified such that other implementations are possible. The method 1700 may be used, in some embodiments, for timing synchronization for device-to-device discovery in asynchronous LTE deployments.

Figure 18:
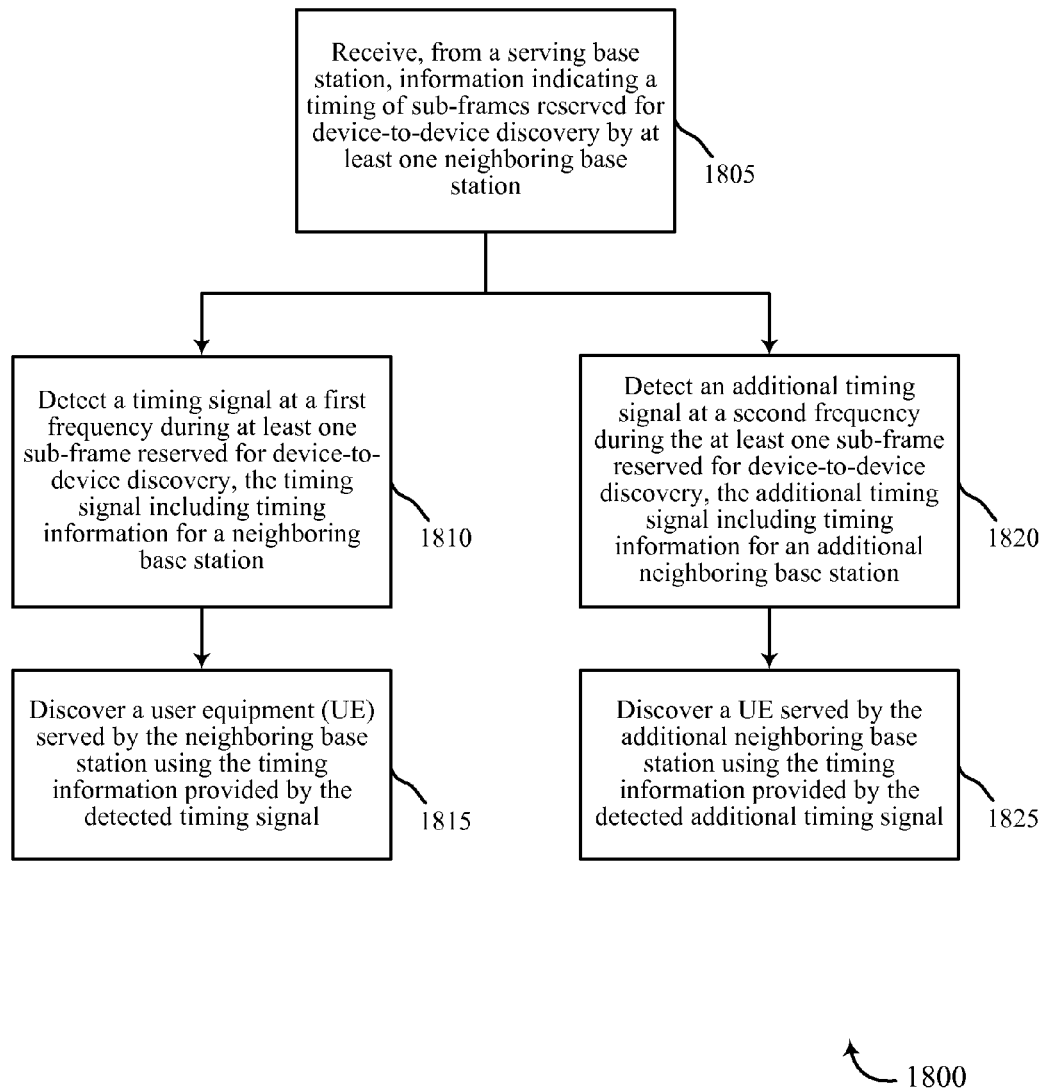

FIG. 18 is a flow chart illustrating an example of a method 1800 for detecting timing information for device-to-device discovery. For clarity, the method 1800 is described below with reference to multiple ones of the UEs 115 described with reference to FIGS. 1, 2, 3, 4, 8, 9, and/or 11. In one embodiment, a UE 115 may execute one or more sets of codes to control the functional elements of the UE 115 to perform the functions described below.

At block 1805, information indicating a timing of sub-frames reserved for device-to-device discovery by at least one neighboring base station may be received (e.g., at a UE 115) from a serving base station 105. The device or UE 115 performing the method 1800 may be synchronized with the base station 105. The base station 105 may in some cases be associated with a particular cell or coverage area.

At block 1810, a timing signal including timing information for a neighboring base station may be detected at a first frequency during a sub-frame reserved for device-to-device discovery. The timing information may in some cases include symbol-level timing information for the neighboring base station. At block 1815, a UE 115 serviced by the neighboring base station may be discovered using the timing information provided by the detected timing signal.

Optionally, at block 1820, an additional timing signal including timing information for an additional neighboring base station may be detected at a second frequency during a sub-frame reserved for device-to-device discovery. The timing information may in some cases include symbol-level timing information for the additional neighboring base station. At block 1825, a UE 115 serviced by the additional neighboring base station may be discovered using the timing information provided by the detected additional timing signal. The timing signal detected at block 1810 and the additional timing signal detected at block 1820 may be detected in the same or different sub-frames.

In some cases, the timing signal and/or additional timing signal may include a PSS transmitted by the neighboring base station and/or additional neighboring base station. In other cases, the timing signal and/or additional timing signal may include both a PSS and an SSS transmitted by the neighboring base station and/or the additional neighboring base station.

The operation(s) at block 1805, 1810, 1815, 1820, and/or 1825 may in some cases be performed using the device-to-device discovery module 215 described with reference to FIGS. 2, 3, 4, and/or 8.

Thus, the method 1800 may provide for forwarding timing information for device-to-device discovery. It should be noted that the method 1800 is just one implementation and that the operations of the method 1800 may be rearranged or otherwise modified such that other implementations are possible. The method 1800 may be used, in some embodiments, for timing synchronization for device-to-device discovery in asynchronous LTE deployments.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The communication networks that may accommodate some of the various disclosed embodiments may be packet-based networks that operate according to a layered protocol stack. For example, communications at the bearer or Packet Data Convergence Protocol (PDCP) layer may be IP-based.

A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote light source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   receiving at a mobile device, from a first base station, timing information for the first base station; and
   transmitting, from the mobile device, a timing signal comprising the timing information to at least one asynchronous mobile device served by a second base station, the timing signal being transmitted using one or more symbols at a first frequency during a first portion of a sub-frame reserved for device-to-device discovery, wherein an additional timing signal comprising timing information for an additional base station is transmitted using one or more symbols at a second frequency during a second portion of the sub-frame.

2. The method of claim 1, wherein the sub-frame during which the timing signal is transmitted is positioned first among a plurality of sub-frames reserved for device-to-device discovery.

3. The method of claim 1, further comprising:
   receiving at the mobile device, from the first base station, instructions to transmit the timing signal; and
   transmitting, from the mobile device, the timing signal after the instructions are received.

4. The method of claim 1, wherein the first frequency is different from the second frequency and the first portion of the sub-frame is different from the second portion of the sub-frame.

5. The method of claim 1, wherein the first base station and the additional base station are non-neighboring base stations.

6. The method of claim 1, further comprising:
   transmitting, from the mobile device, one or more additional copies of the timing signal during at least one additional sub-frame reserved for device-to-device discovery.

7. The method of claim 1, wherein the timing information and the timing signal comprises a primary synchronization signal transmitted by the first base station.

8. The method of claim 1, wherein the timing information and the timing signal comprises a primary synchronization signal (PSS) and a secondary synchronization signal (SSS) transmitted by the first base station.

9. The method of claim 1, further comprising:
transmitting, from the mobile device, a device-to-device discovery signal during at least one sub-frame reserved for device-to-device discovery.

10. The method of claim 9, wherein the device-to-device discovery signal is transmitted during a second sub-frame that is different from the sub-frame during which the timing signal is transmitted.

11. The method of claim 1, wherein the timing information comprises symbol-level timing information for the first base station.

12. An apparatus for wireless communications, comprising:
means for receiving at a mobile device, from a first base station, timing information for the first base station; and
means for transmitting, from the mobile device, a timing signal comprising the timing information to at least one asynchronous mobile device served by a second base station, the timing signal being transmitted using one or more symbols at a first frequency during a first portion of a sub-frame reserved for device-to-device discovery, wherein an additional timing signal comprising timing information for an additional base station is transmitted using one or more symbols at a second frequency during a second portion of the sub-frame.

13. The apparatus of claim 12, wherein the sub-frame during which the timing signal is transmitted is positioned first among a plurality of sub-frames reserved for device-to-device discovery.

14. The apparatus of claim 12, further comprising:
means for receiving at the mobile device, from the first base station, instructions to transmit the timing signal; and
means for transmitting, from the mobile device, the timing signal after the instructions are received.

15. The apparatus of claim 12, wherein the first frequency is different from the second frequency and the first portion of the sub-frame is different from the second portion of the sub-frame.

16. The apparatus of claim 12, wherein the first base station and the additional base station are non-neighboring base stations.

17. The apparatus of claim 12, further comprising:
means for transmitting, from the mobile device, one or more additional copies of the timing signal during at least one additional sub-frame reserved for device-to-device discovery.

18. The apparatus of claim 12, wherein the timing information and the timing signal comprises a primary synchronization signal transmitted by the first base station.

19. The apparatus of claim 12, wherein the timing information and the timing signal comprises a primary synchronization signal (PSS) and a secondary synchronization signal (SSS) transmitted by the first base station.

20. The apparatus of claim 12, further comprising:
means for transmitting, from the mobile device, a device-to-device discovery signal during at least one sub-frame reserved for device-to-device discovery.

21. The apparatus of claim 20, wherein the device-to-device discovery signal is transmitted during a second sub-frame that is different from the sub-frame during which the timing signal is transmitted.

22. The apparatus of claim 12, wherein the timing information comprises symbol-level timing information for the first base station.

23. A method for wireless communications, comprising:
transmitting, to a mobile device, timing information for a first base station; and
transmitting instructions to the mobile device to transmit a timing signal comprising the timing information to at least one asynchronous mobile device served by a second base station using one or more symbols at a first frequency during a first portion of a sub-frame reserved for device-to-device discovery, wherein an additional timing signal comprising timing information for an additional base station is transmitted using one or more symbols at a second frequency during a second portion of the sub-frame.

24. The method of claim 23, further comprising:
transmitting, to at least one other mobile device, the timing information for the first base station; and
transmitting instructions to a subset of mobile devices, selected from the mobile device and the at least one other mobile device, to transmit the timing signal comprising the timing information during the sub-frame reserved for device-to-device discovery.

25. The method of claim 23, further comprising:
applying an extended cyclic prefix to the sub-frame during which the timing signal is transmitted.

26. An apparatus for wireless communications, comprising:
a processor;
memory in electronic communication with the processor, the memory storing instructions executable by the processor to:
transmit, to a mobile device, timing information for the apparatus; and
transmit instructions to the mobile device to transmit a timing signal comprising the timing information to at least one asynchronous mobile device served by a different base station than the mobile device using one or more symbols at a first frequency during a first portion of a sub-frame reserved for device-to-device discovery, wherein an additional timing signal comprising timing information for an additional base station is transmitted using one or more symbols at a second frequency during a second portion of the sub-frame.

27. The apparatus of claim 26, the instructions further executable by the processor to:
transmit, to at least one other mobile device, the timing information for the apparatus; and
transmit instructions to a subset of mobile devices, selected from the mobile device and the at least one other mobile device, to transmit the timing signal comprising the timing information during the sub-frame reserved for device-to-device discovery.

28. The apparatus of claim 26, the instructions further executable by the processor to:
apply an extended cyclic prefix to the sub-frame during which the timing signal is transmitted.

* * * * *